(12) United States Patent
Matveev et al.

(10) Patent No.: US 12,530,573 B1
(45) Date of Patent: Jan. 20, 2026

(54) EFFICIENT EXECUTION OF GROUP-SPARSIFIED NEURAL NETWORKS

(71) Applicant: Red Hat, Inc., Raleigh, NC (US)

(72) Inventors: Alexander Matveev, Cambridge, MA (US); Nir Shavit, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 1181 days.

(21) Appl. No.: 17/324,338

(22) Filed: May 19, 2021

Related U.S. Application Data

(60) Provisional application No. 63/026,985, filed on May 19, 2020.

(51) Int. Cl.
*G06N 3/08* (2023.01)
*G06N 3/04* (2023.01)
(Continued)

(52) U.S. Cl.
CPC ............... *G06N 3/08* (2013.01); *G06N 3/04* (2013.01); *G06N 3/0464* (2023.01);
(Continued)

(58) Field of Classification Search
CPC .......... G06N 3/08; G06N 3/04; G06N 3/0495; G06N 20/00; G06N 3/082; G06N 20/10; G06N 3/0464
See application file for complete search history.

(56) References Cited

U.S. PATENT DOCUMENTS

| 5,577,166 A | 11/1996 | Mizuno |
| 9,558,156 B1 | 1/2017 | Bekas et al. |

(Continued)

FOREIGN PATENT DOCUMENTS

| CN | 107832839 | 3/2018 |
| EP | 3 037 980 | 6/2016 |

(Continued)

OTHER PUBLICATIONS

Liu, Weifeng, and Brian Vinter. "A framework for general sparse matrix-matrix multiplication on GPUs and heterogeneous processors." Journal of Parallel and Distributed Computing 85 (2015): 47-61. (Year: 2015).*

(Continued)

*Primary Examiner* — Michelle T Bechtold
*Assistant Examiner* — Nicholas S Wu
(74) *Attorney, Agent, or Firm* — Kilpatrick Townsend & Stockton LLP

(57) ABSTRACT

Creating neural network (NN) code may include for each row in a kernel matrix, finding the first non-zero element; and creating a loop including multiply and add instructions. On each iteration of the loop, the multiply and add instructions may be executed, and the position of the kernel matrix operand operated on by each multiply and add may be correlated to the loop iteration number. Instructions may be issued or created to be executed in the loop. A method may execute a NN by executing a loop including a series of multiply and add instructions to multiply a kernel matrix A by an input, such that on each iteration of the loop the series of multiply and add instructions are executed; and the position of the matrix A operand operated on by each multiply and add instruction in the series is correlated to the iteration number of the loop.

20 Claims, 10 Drawing Sheets

(51) Int. Cl.
  *G06N 3/0464* (2023.01)
  *G06N 3/0495* (2023.01)
  *G06N 3/082* (2023.01)
  *G06N 20/00* (2019.01)
  *G06N 20/10* (2019.01)

(52) U.S. Cl.
  CPC .......... *G06N 3/0495* (2023.01); *G06N 3/082* (2013.01); *G06N 20/00* (2019.01); *G06N 20/10* (2019.01)

(56) References Cited

U.S. PATENT DOCUMENTS

| | | | |
|---|---|---|---|
| 9,811,775 | B2 | 11/2017 | Krizhevsky et al. |
| 9,818,059 | B1 | 11/2017 | Woo et al. |
| 10,157,045 | B2 | 12/2018 | Venkataramani et al. |
| 10,223,333 | B2 | 3/2019 | Chetlur et al. |
| 10,572,568 | B2 | 2/2020 | Narayanamoorthy et al. |
| 10,685,082 | B2 | 6/2020 | Bekas et al. |
| 10,719,323 | B2 | 7/2020 | Baum et al. |
| 2010/0076915 | A1 | 3/2010 | Xu et al. |
| 2011/0119467 | A1 | 5/2011 | Cadambi et al. |
| 2013/0138589 | A1 | 5/2013 | Yu et al. |
| 2016/0224465 | A1 | 8/2016 | Morad et al. |
| 2016/0239706 | A1 | 8/2016 | Dijkman et al. |
| 2016/0328643 | A1 | 11/2016 | Liu et al. |
| 2016/0358070 | A1 | 12/2016 | Brothers et al. |
| 2016/0379109 | A1 | 12/2016 | Chung et al. |
| 2017/0032487 | A1 | 2/2017 | Ashari et al. |
| 2017/0103313 | A1 | 4/2017 | Ross et al. |
| 2017/0103314 | A1 | 4/2017 | Young |
| 2017/0132496 | A1 | 5/2017 | Shoaib et al. |
| 2017/0169567 | A1 | 6/2017 | Chefd'Hotel et al. |
| 2017/0193361 | A1 | 7/2017 | Chilimbi et al. |
| 2017/0200094 | A1 | 7/2017 | Bruestle et al. |
| 2017/0220524 | A1 | 8/2017 | Herrero Abellanas et al. |
| 2017/0316311 | A1 | 11/2017 | Pilly et al. |
| 2017/0316312 | A1 | 11/2017 | Goyal et al. |
| 2017/0372202 | A1 | 12/2017 | Ginsburg et al. |
| 2018/0046900 | A1 | 2/2018 | Dally et al. |
| 2018/0046916 | A1* | 2/2018 | Dally .................. G06F 7/523 |
| 2018/0096226 | A1 | 4/2018 | Aliabadi et al. |
| 2018/0173571 | A1 | 6/2018 | Huang et al. |
| 2018/0253402 | A1 | 9/2018 | Redfern et al. |
| 2018/0315159 | A1 | 11/2018 | Ould-Ahmed-Vall et al. |
| 2018/0322390 | A1 | 11/2018 | Das et al. |
| 2018/0336468 | A1 | 11/2018 | Kadav et al. |
| 2019/0042250 | A1 | 2/2019 | Anders et al. |
| 2019/0042542 | A1 | 2/2019 | Narayanamoorthy et al. |
| 2019/0056916 | A1 | 2/2019 | Varma et al. |
| 2019/0138902 | A1 | 5/2019 | Matveev et al. |
| 2019/0156206 | A1 | 5/2019 | Graham et al. |
| 2019/0156214 | A1 | 5/2019 | Matveev et al. |
| 2019/0156215 | A1 | 5/2019 | Matveev et al. |
| 2019/0179818 | A1 | 6/2019 | Lee |
| 2019/0212982 | A1 | 7/2019 | Yoda et al. |
| 2019/0303743 | A1 | 10/2019 | Venkataramani et al. |
| 2019/0354894 | A1 | 11/2019 | Lazovich et al. |
| 2019/0370071 | A1 | 12/2019 | Matveev et al. |
| 2019/0370644 | A1 | 12/2019 | Kenney et al. |
| 2020/0034710 | A1 | 1/2020 | Sidhu et al. |
| 2020/0097826 | A1 | 3/2020 | Du et al. |
| 2020/0104717 | A1 | 4/2020 | Alistarh |
| 2020/0160181 | A1 | 5/2020 | Zlateski et al. |
| 2020/0160182 | A1 | 5/2020 | Matveev et al. |
| 2020/0193274 | A1 | 6/2020 | Darvish Rouhani et al. |
| 2020/0218978 | A1 | 7/2020 | Kopinsky |
| 2020/0326326 | A1* | 10/2020 | Liu .................. G06F 9/3887 |
| 2020/0342301 | A1 | 10/2020 | Miao et al. |
| 2021/0097130 | A1* | 4/2021 | Liu .................. H03M 7/3066 |

FOREIGN PATENT DOCUMENTS

| | | |
|---|---|---|
| WO | WO 2017/049496 | 3/2017 |
| WO | WO 2018/053835 | 3/2018 |
| WO | WO 2019/090325 A1 | 5/2019 |
| WO | WO 2020/046859 A1 | 3/2020 |
| WO | WO 2020047823 A1 | 3/2020 |
| WO | WO 2020/072274 A1 | 4/2020 |

OTHER PUBLICATIONS

Liu, Baoyuan, et al. "Sparse convolutional neural networks." Proceedings of the IEEE conference on computer vision and pattern recognition. 2015. (Year: 2015).*

Lebedev, Vadim, and Victor Lempitsky. "Fast convnets using groupwise brain damage." Proceedings of the IEEE conference on computer vision and pattern recognition. 2016. (Year: 2016).*

Wen, Wei, et al. "Learning structured sparsity in deep neural networks." Advances in neural information processing systems 29 (2016). (Year: 2016).*

Buluc, Aydin, and John R. Gilbert. "On the representation and multiplication of hypersparse matrices." 2008 IEEE International Symposium on Parallel and Distributed Processing. IEEE, 2008. (Year: 2008).*

Liu W, Vinter B. A framework for general sparse matrix-matrix multiplication on GPUs and heterogeneous processors. Journal of Parallel and Distributed Computing. Nov. 1, 2015;85:47-61. (Year: 2015).*

Liu B, Wang M, Foroosh H, Tappen M, Pensky M. Sparse convolutional neural networks. InProceedings of the IEEE conference on computer vision and pattern recognition 2015 (pp. 806-814). (Year: 2015).*

Deshpande, A beginner's guide to understanding convolutional neural networks, Jul. 20, 2016.

Alwani et al., "Fused-layer CNN accelerators." 49th Annual IEEE/ACM International Symposium on Microarchitecture (MICRO), 2016, pp. 1-12.

Du et al., "Width Provably Matters in Optimization for Deep Linear Neural Networks", May 27, 2019, arXiv:1901.08572v3.

Gale et al., "The State of Sparsity in Deep Neural Networks", Feb. 25, 2019, arXiv:1902.09574v1.

Han et al., "Learning both Weights and Connections for Efficient Neural Networks", 2015, Advances in Neural Information Processing Systems, vol. 28.

Hinton et al., "Distilling the Knowledge in a Neural Network", Mar. 9, 2015.

Lavin et al., "Fast Algorithms for Convolutional Neural Networks", Nov. 10, 2015.

Lecun et al., "Optimal brain damage", Advances in neural information processing systems, 1990, pp. 598-605.

Mishra et al., "Apprentice: Using Knowledge Distillation Techniques to Improve Low-Precision Network Accuracy", Nov. 15, 2017.

Rusu et al., "Progressive Neural Networks", Sep. 7, 2016.

Budden et al., "Deep tensor convolution on multicores", In Proceedings of the 34th International Conference on Machine Learning, 2017, vol. 70, pp. 615-624.

Chen, Xuhao, "Escoin: Efficient Sparse Convolutional Neural Network Inference on GPUs." From Jul. 2017 "Conference '17", Apr. 3, 2019 (Apr. 3, 2019) Retrieved on Jan. 17, 2020 (Jan. 17, 2020)from <https://arxiv.orq/pdf/1802.10280.pdb entire document.

Georganas et al., "Anatomy Of High-Performance Deep Learning Convolutions On SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.orq/pdf/1808.05567 .pdf entire document.

Kaya et al., "Scalable sparse tensor decompositions in distributed memory systems", SC'15: Proceedings of the International Conference for High Performance Computing, Networking, Storage and Analysis, IEEE, 2015. (Year: 2015).

Kim et al., "Designing Vector-Friendly Compact BLAS and LAPACK Kernels", SC17, Nov. 12-17, 2017, Denver, CO, USA.

Lascorz et al., "Bit-Tactical: Exploiting Ineffectual Computations in Convolutional Neural Networks: Which, Why, and How", Mar. 9, 2018.

(56) References Cited

OTHER PUBLICATIONS

Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020.
Papyan et al., "Convolutional neural networks analyzed via convolutional sparse coding." In: The Journal of Machine Learning Research. Jul. 17, 2017 (Jul. 17, 2017) Retrieved on Feb. 20, 2020.
Scardapane et al. "Group sparse regularization for deep neural networks.", In: Neurocomputing. Jul. 2, 2016 (Jul. 2, 2016) Retrieved on Nov. 16, 2019 (Nov. 16, 2019).
Smith et al., "SPLATT: Efficient and parallel sparse tensor-matrix multiplication", 2015 IEEE International Parallel and Distributed Processing Symposium, IEEE, 2015, (Year: 2015).
Wozniak et al., "GiMMiK-Generating bespoke matrix multiplication kernels for accelerators: Application to high-order Computational Fluid Dynamics", Computer Physics Communications, vol. 202, 2016, pp. 12-22.
Zhangxiaowen Gong et al. "Sparse Train: Leveraging Dynamic Sparsity in Training DNNs on General-Purpose SIMD Processors"; 2019.
Yu, Dong, Li Deng, and Frank Seide. "The deep tensor neural network with applications to large vocabulary speech recognition". IEEE Transactions on Audio Speech, and Language Processing 21.2 (2012): 388-396. (Year: 2012).
Kurtz, Mark, et al. "Inducing and Exploiting Activation Sparsity for Fast Neural Network Inference." Proceedings of the International Conference on Machine Learning. 2020.
Robert Lim; "Methods for Accelerating Machine Learning in High Performance Computing"; University of Oregon—AREA-2019-01.
Zhizhou Li et al.; "A CPU-based Algorithm for Traffic Optimization Based on Sparse Convolutional Neural Networks"; 2017 IEEE 30th Canadian Conference on Electrical and Computer (CCECE).
Baoyuan Liu et al.; "Sparse Convolutional Neural Networks"; CVPR 2015—Computer Vision Foundation—IEEE.
Hesham Mostafa et al.; "Parameter Efficient Training of Deep Convolutional Neural Networks by Dynamic Sparse Reparameterization"; Proceedings of the 36 th International Conference on Machine Learning, Long Beach, California, PMLR 97, 2019.
Israt Nisa et al.; "Sampled Dense Matrix Multiplication for High-Performance Machine Learning"; 2018 IEEE 25th International Conference on High Performance Computing (Hi PC).
Yang, Huanrui, Wei Wen, and Hai Li. "Deephoyer: Learning sparser neural network with differentiable scale-invariant sparsity measures." arXiv preprint arXiv:1908.09979 (2019).
Yuster, Raphael, and Uri Zwick. "Fast sparse matrix multiplication." ACM Transactions On Algorithms (TALG) 1.1 (2005): 2-13.
Paixao, Crysttian A., and Flávio CodeçCoelho. Matrix compression methods. No. e1049. PeerJ PrePrints, 2015.
Park, Jongsoo, et al. "Faster cnns with direct sparse convolutions and guided pruning." arXiv preprint arXiv:1608.01409 (2016).
https://www.kinematicsoup.com/news/2016/9/6/data-compression-bit-packing-101, published Sep. 6, 2016.

* cited by examiner

EFFICIENT EXECUTION OF GROUP-SPARSIFIED NEURAL NETWORKS

RELATED APPLICATION DATA

The present application claims benefit from U.S. provisional Patent Application 63/026,985, filed on May 19, 2020, and entitled "EFFICIENT EXECUTION OF GROUP-SPARSIFIED NEURAL NETWORKS", the contents of which is incorporated herein by reference in its entirety.

FIELD OF THE INVENTION

The present invention relates generally to neural networks; more specifically improving execution through novel organization of data and code.

BACKGROUND

Artificial neural networks (ANNs, or NNs, used herein interchangeably) are effective at solving real-world tasks such as image classification, speech recognition and synthesis and reinforcement learning. ANN models are notoriously intensive in use of computing resources, memory space, and energy consumption, requiring powerful and often specialized computer hardware to train and evaluate. For instance, ResNet50, a standard model for image classification, has in the order of 26 million parameters, and requires 4 billion floating point operations to evaluate a single image, on standard parameter settings.

ANNs may be computing systems inspired by biological computing systems, but operating using manufactured digital computing technology. ANNs are made up of computing units typically called neurons (which are artificial neurons, as opposed to real-world biological neurons) communicating with each other via connections, links or edges. The signal sent via the link between neurons can be for example a real number, and the output of each neuron can be computed by function of the (typically weighted) sum of its inputs, such as a rectified linear unit (ReLU) function. NN links or edges typically have a weight that may be adjusted as learning proceeds. The weight increases or decreases the strength of the signal at a connection.

NNs are typically modelled (e.g., mathematically, as matrices) and executed on conventional or special purpose computing systems such as Central Processing Units (CPUs) or graphical processing units (GPUs). Thus a NN may not have physical neurons and links, but rather may be a model, a mathematical representation of a NN, e.g. using matrices and other structures, stored as data for example in a computer memory.

Typically, NN neurons are divided or arranged into layers, where different layers may be adapted to perform different kinds of transformations on their inputs and can have different patterns of connections with other layers. A convolutional layer may apply an operation (e.g., a convolution operation) on one or more input data elements (e.g., neurons of an input layer) of the NN, to extract features that may be included input data. For example, input may include a red, green and blue (RGB) representation of an image, and a convolutional layer may extract a feature of the represented image, such as edges.

A NN filter may refer herein to a portion of a convolutional layer that may apply a convolution function on incoming input data to extract a feature of the incoming input data. A NN filter may be implemented as, or may include, one or more NN kernels, which may apply different aspects of filtering. For example, a convolutional layer may include a first filter adapted to extract a first feature of the represented image (e.g., edges in the image) and a second filter to extract a second feature of the image. Each filter may include a number (e.g., three) two-dimensional (2D) kernels, each adapted to collaborate with, or be applied to a single channel (e.g., the R, G or B channel) of the input layer.

The terms "elements" or "NN elements" may refer herein to numerical elements that may be included in components (e.g., layers, kernels, etc.) of a NN, including for example kernel elements, layer elements and the like. Components or elements of NNs may be represented as matrices. For example, layers, filters and/or kernels of the NN may be represented by multidimensional matrices or tensors. One or more (e.g., each) numerical elements of such a matrix may be referred to as NN elements of the respective layer, filter and/or kernel, and may be assigned a weight value.

A "kernel tensor" or "kernel matrix" may be a multidimensional data structure, that may include or represent a plurality of NN elements of a kernel. For example, a kernel tensor may include multiple dimensions, such as a first spatial position of the 2D kernels (e.g., an X dimension), a second spatial position of the 2D kernels (e.g., a Y dimension), an index of the kernels (a "kernel index", in this example from 1 to 3) and an index of the filters (a "filter index", in this example from 1 to 2).

Efficient hardware support for ANN execution includes for example, GPUs that are customized to perform fast neural network computation; specialized hardware such as Google's Tensor Processing Units (TPUs); and specialized instruction sets, such as Intel's Vectorized Neural Network Instructions (VNNI) which aim to provide additional hardware support for fast neural network computation on standard CPUs.

Methods exist to compress ANN models without losing accuracy. Two ways of accomplishing such compression include: (a) pruning, or reduction of the number of connections (or in some implementations the number of active entries in a kernel used to produce the output of a NN layer) in a NN; and (b) quantization, or reduction of the floating point or other precision at which the weights and activations or other values in a neural network are expressed (e.g., to lower the standard 64 or 32 bits per number to represent the same number using, e.g. 8 bits).

While currently available systems and methods may provide efficient hardware execution for each one of these methods in isolation, it is currently impossible to exploit the benefits of both pruning and quantization in conjunction on existing computer hardware, particularly on commodity CPUs. This is because there is currently no efficient hardware support for ANNs which are both quantized and pruned. In fact, the existing hardware instructions for vectorized execution of instructions on CPUs, such as the VNNI instructions by Intel, make it difficult to use them efficiently on sparse computations.

NN execution may require extensive calculations, including for example calculations of matrix multiplication. Modern computing devices may support vectoral or vector instructions, that may be adapted to simultaneously address a plurality of operands. Vectoral or vector instructions may receive as input, at least one vector including a plurality of elements, and may operate on the plurality of elements within the scope of a single instruction (e.g., without having to perform multiple operand fetch cycles). Currently available systems for execution of NN models may employ vectoral instructions such as vectoral fused multiply accumulate (FMA) instructions or vectoral multiply and accumulate (MAC) instructions, to improve the efficiency of matrix multiplication, and thus also improve the efficiency NN execution.

SUMMARY

A method of creating neural network (NN) code for a NN including kernels may include for a matrix A representing a kernel of the NN, for each row in matrix A, finding the first non-zero element of the row; and creating a loop including a series of multiply and add instructions. On each iteration of the loop, when executed, the series of multiply and add instructions may be executed, and the position of the matrix A operand operated on by each multiply and add instruction in the series may be correlated to the iteration number of the loop. Instructions may be issued or created to exist within the loop, e.g. the process may create a series of multiply-add instructions corresponding to the first non-zero element of each row, these instructions being repeatedly executed by the loop.

A method may execute a NN which includes kernels by executing a loop including a series of multiply and add instructions to multiply a kernel matrix A by an input, such that on each iteration of the loop the series of multiply and add instructions are executed; and the position of the matrix A operand operated on by each multiply and add instruction in the series is correlated to the iteration number of the loop.

The kernel matrix may be group-sparse. The term group-sparse may be used herein in relation to a matrix or tensor, to indicate that the matrix may be: (a) sparse, e.g., have or include a plurality of zero or null values; and (b) include groups, arrays or tensors of NN elements or operands that are non-zero, where all elements of the matrix not in a group are zero. Multiply and add, vectoral or vector operations used with embodiments of the invention may, for example, be a fused multiply accumulate (FMA) operation.

BRIEF DESCRIPTION OF THE DRAWINGS

The subject matter herein is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
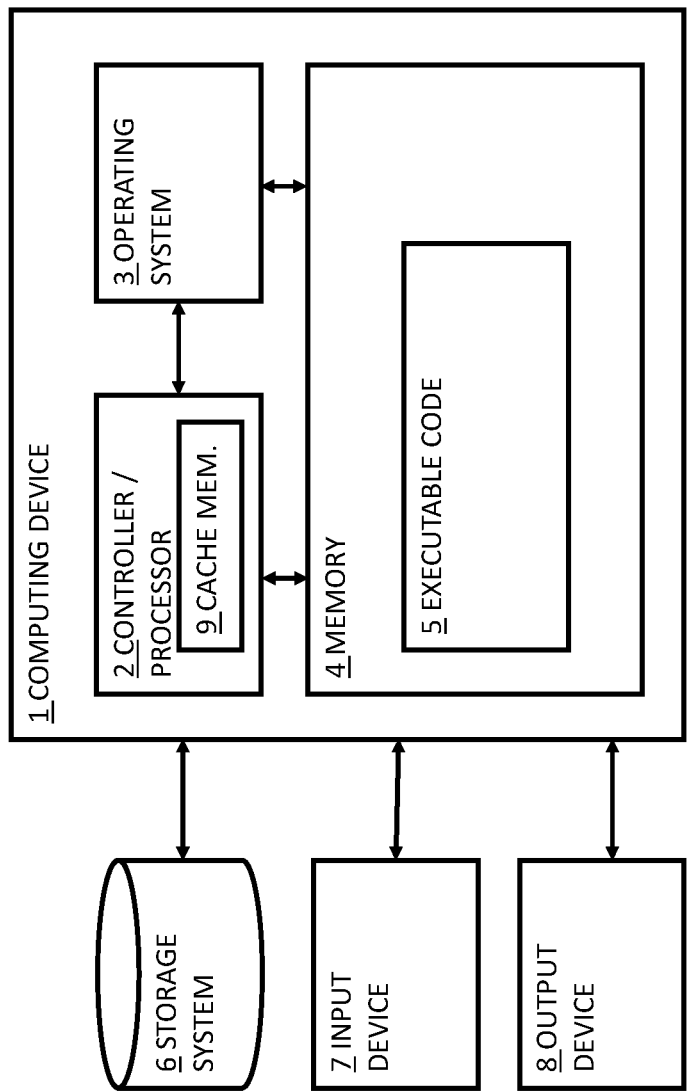
FIG. 1 is a block diagram depicting a computing device, which may be included within an embodiment of a system, according to some embodiments of the invention.

One skilled in the art will realize the disclosed subject matter may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the disclosed subject matter may be practiced without these specific details. Well-known methods, procedures, and components have not been described in detail so as not to obscure the invention. Some features or elements described with respect to one embodiment may be combined those of other embodiments. For clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operations and/or processes of a computer, a computing platform, a computing system, or other electronic computing device, that manipulates or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

The term "set" when used herein may include one or more items. Unless explicitly stated, the method embodiments described herein are not constrained to a particular order or sequence. Some of the method embodiments or elements thereof can occur or be performed simultaneously, at the same point in time, or concurrently.

The term "group sparse" may refer herein to a configuration of a matrix (e.g., a kernel matrix) that may include one or more element arrays, each including a group of contiguous NN elements which are generally non-zero, and where all other NN elements of the matrix (elements outside groups) are set to null (e.g., zero). Some elements within a group may be non-zero (e.g. if the original kernel included one or more zero values), but typically all elements outside groups are zero.

The term nullification may be used herein in relation to one or more NN elements to describe an assignment of a value (e.g., a zero or null value or any form of label) to indicate that the relevant NN elements do not contribute to a specific calculation (e.g., training and/or inference) of the NN. For example, embodiments may receive a first version of an NN model, including a first version of at least one kernel. The first version of the kernel may be dense, as commonly referred to in the art, to indicate that it may have a large portion or ratio of non-zero elements, relative to its overall number of elements. Embodiments of the invention may nullify one or more elements (e.g., a block of elements) of the first version of the kernel, to produce a second version of the kernel, in which the one or more nullified elements are assigned a null weight value.

The term "pruning" may describe creating one or more nullified elements of the NN, to indicate deletion, setting to zero, "skipping" or omission of the one or more nullified elements from the specific calculation (e.g., training and/or inference) of the NN. Embodiments may prune the one or more nullified elements (e.g., the block of elements) of the kernel, in a sense that embodiments may omit the one or more nullified elements from execution (e.g., training, inferring, etc.) of the NN.

"Quantization" may describe diminishing a representation (e.g., in bits) of a NN element or of a weight of a NN element, or lowering the resolution of the number or the number of bits used to represent the number. For example, embodiments may perform quantization of one or more NN elements included in an element array, according to specific parameters of a given instruction set, for example representing numbers using four bits instead of 32. In embodiments where quantization is used, typically values in a kernel (A) and input (B) may have their values quantized or represented using the same number of bits, while the result (e.g. C) may have a larger bit size to avoid overflow. E.g. each value in A and B may be represented by 8 bits, with the result entries represented by 32 bits.

The terms vectoral or vector instruction and vectoral or vector operation may be used interchangeably to refer to instructions for a processing unit (e.g., a CPU) that may simultaneously address a plurality of operands. Vector or vectoral instructions or operations may receive as input at least one vector that may include a plurality of elements, stored on an input vector register. Vectoral instructions may operate on the plurality of elements of the input vector register within the scope of a single instruction (e.g., without having to perform multiple operand fetch cycles). An example includes vectoral multiplication instruction, in which elements of two input vector registers are respectively dot-multiplied, as commonly referred to in the art, to produce a vector of respective product results. The vector of output results may be stored in an output vector register. A vectoral instruction set may include a group or set of vectoral instructions, that may be defined, for example, by a specific hardware or processor vendor. An example for a vectoral instruction set may be the Intel VNNI instruction set.

The term indexed axis may be used herein to refer to a specific location of a elements in a matrix (e.g., a kernel matrix). For example, in a 2D kernel matrix, a first indexed axis may be a specific row of NN elements, and a second indexed axis may be a specific column of NN elements.

Reference is now made to FIG. 1, which is a block diagram depicting a computing device, for processing or executing of NNs, according to some embodiments. Computing device 1 may include a controller or processor 2 that may be, for example, a central processing unit (CPU) processor, a chip or any suitable computing or computational device, an operating system 3, a memory 4, executable code 5, a storage system 6, input devices 7, output devices 8 and cache memory 9. Processor or controller 2 (or one or more controllers or processors, possibly across multiple units or devices) may be configured to carry out methods described herein, and/or to execute or act as the various modules, units, etc. E.g. computing device 1 may act as a NN, or train or create a NN. More than one computing device 1 may be included in, and one or more computing devices 1 may act as the components of, a system according to embodiments of the invention. Embodiments of the disclosed subject matter may be executed by one or more systems such as in FIG. 1. For example, a system as in FIG. 1 may train a NN, sparsify a NN, create code to execute a NN, and/or execute (e.g. at inference) a NN.

Operating system 3 may be or may include any code segment (e.g., one similar to executable code 5 described herein) designed and/or configured to perform tasks involving coordination, scheduling, controlling or managing operation of device 1, for example, scheduling software. Controller or processor element 2 may be a multicore processor, e.g. a CPU or GPU, e.g. one chip including a number of cores, each capable of executing a processing thread at the same time other cores in the controller or processor 2 are executing another, possibly different, threat.

Controller or processor 2 may include, or may be associated with one or more cache memory elements 9. In some embodiments, some cache elements 9 may be local or private to a specific core, and other caches may be shared by all cores on a controller or processing unit 2. The one or more cache memory elements 9 may be or may include for example, a cache layer 1 (CL1, e.g. L1 cache) module, a cache layer 2 (CL2 e.g. L2 cache) module and/or a cache layer 3 (e.g., CL3 e.g. L3 cache) cache memory module. Other numbers or types of caches may be used. Caches may be hierarchical, with caches closer to a core (e.g. L1) reading from and writing to caches further from the core (e.g. L2 or L3) which in turn read or write from memory. Cache memory 9 may include, for example, an instruction cache memory space and/or a data cache memory space, and may be configured to cooperate with one or more processors (such as element 2) and/or one or more processing cores to execute at least one method according to embodiments of the disclosed subject matter. Cache memory 9 may typically be implemented on the same die or chip as controller or processor 2 and may thus be characterized by a memory bandwidth that may be higher than that of memory 4 and storage system 6, which are typically not on the same chip as processor 2. However, caches external to the processor chip may be used.

Memory 4 may be or may include, for example, a Random Access Memory (RAM), a read only memory (ROM), a Flash memory, volatile or non-volatile memory, or other suitable memory units or storage units. Memory 4 may be or may include a plurality of, possibly different memory units. Memory 4 may be a computer or processor non-transitory readable medium, or a computer non-transitory storage medium. A non-transitory storage medium such as memory 4, a hard disk drive, another storage device, etc. may store instructions or code which when executed by a processor may cause or configure the processor to carry out methods as described herein.

Executable code 5 may be any executable code, e.g., an application, a program, or script. Executable code 5 may be executed by controller 2 possibly under control of operating system 3. Processor or controller 2 may be configured to carry out embodiments of the disclosed subject matter by executing executable code 5, which may be stored on a non-transitory storage medium such as memory 4, storage system 6, or another storage system. A system according to some embodiments may include a plurality of executable code segments similar to executable code 5 that may be loaded into memory 4 and cause controller 2 to carry out methods described herein.

Storage system 6 may be or may include, for example, a flash memory, a memory that is internal to, or embedded in, a micro controller or chip a hard disk drive, a CD-Recordable (CD-R) drive, a universal serial bus (USB) device or other suitable removable and/or fixed storage unit.

Data pertaining to one or more NN models may be stored in storage system 6 and may be loaded from storage system 6 into memory 4 where it may be processed by controller 2. In some embodiments, some of the components shown in FIG. 1 may be omitted.

Input devices 7 may be or may include any suitable input devices, components or systems, e.g., a detachable keyboard or keypad, a mouse and the like. Output devices 8 may include one or more displays or monitors, speakers and/or any other suitable output devices. Any applicable input/output (I/O) devices may be connected to computing device 1 as shown by blocks 7 and 8. For example, a wired or wireless network interface card (NIC), a universal serial bus (USB) device or external hard drive may be included in input devices 7 and/or output devices 8.

Embodiments may produce kernels that have group sparsity. In semi-structured or group-sparse neural networks weights are removed from the kernels such that the non-zero values appear in groups of consecutive values (e.g. typically with no zero values in-between), each group surrounded by zero values. Embodiments of the invention may include a semi-structured pruning method, which may prune or nullify NN elements in one or more kernels of a NN. This may be done in a pattern that is dependent on the layout of the weights in a kernel matrix, and may be specifically designed to be compatible with quantized vectorized operations such as vector or vectoral operations of the VNNI instruction set. In some embodiments pruning may be performed with the aim of a certain instruction and/or a specific target processor or target architecture, on which the NN is to be executed (e.g., inferred or trained). Embodiments may prepare a network for quantization by pruning. In a subsequent quantization stage or phase, the precision of the underlying weights may be lowered, and the weights may be represented by fewer bits than their pre-quantized value.

One embodiment may run a sliding window along each row of a kernel to be sparsified, the size of the window defining the group size, the sliding window moving across the rows with a stride of the group size, where an entire window is sparsified at once, to result in the remaining (non-sparsified entries) existing in groups having the size of the window. Alternately, groups may be sparsified in an organization such that the un-sparsified entries are grouped in a target size G. Typically the non-sparsified entries are in multiple groups all having the same size; however these groups need not be positioned in rows with an offset from the beginning of the row being a multiple of the group size. E.g. a group of size 4 may start at the second entry in a row.

Embodiments of the invention may combine group sparsity with code or execution design to provide an efficient way of executing group-sparse neural networks on CPUs for example using the AVX vector instructions available on them, or other instruction sets. Embodiments may use the structured property of the non-zero weights in a group-sparse network to improve performance when executed with sparse GEMM (general matrix to matrix multiplication) code embodying kernels that execute the NN matrix multiplications using non-zero weight embedded full loop unrolling. Loop unrolling may include creating matrix multiplication code which embodies only non-zero elements of a kernel which is one of the matrices being multiplied, and which does not include code that multiplies zero elements. However in some embodiments using a frontier, occasional instructions may operate on zero elements.

Convolutional Neural Networks (CNNs) are discussed herein, but embodiments of the invention may be applied to different NN layer types and NN architectures. As known in the art, a CNN may include a sequence of convolutional, pooling, and fully-connected layers, each of which may apply a non-linear transformation to its input.

Figure 2:
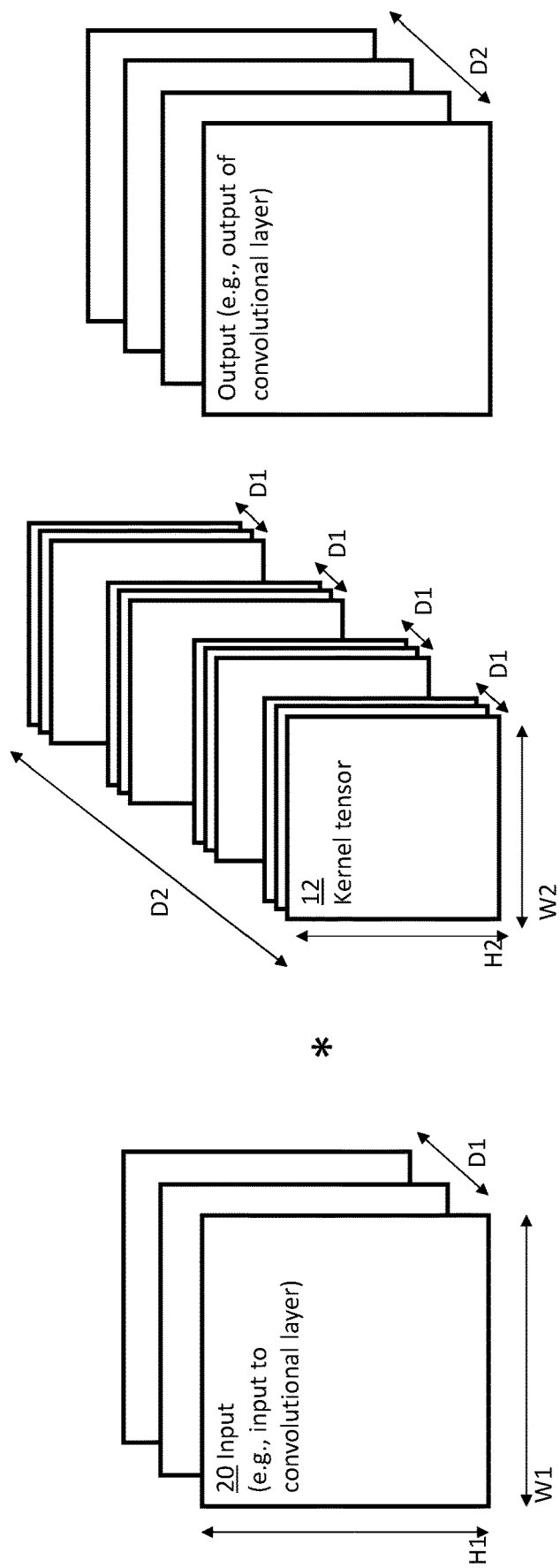
FIG. 2 is a schematic diagram, depicting a non-limiting example of a convolutional layer of a convolutional neural network according to an embodiment of the invention.

Reference is now made to FIG. 2, which is a schematic diagram, depicting a non-limiting example of a convolutional layer of a CNN. In this example, the input of a convolutional layer may be structured as a set of D1 (in this example, three) channels, each of which is represented as a 2D data structure. For example, the input to the convolution layer may be or include a data structure such as an image, and each channel of the D1 channels may correspond to a single channel (e.g., R, G and B) of the input image 20. In the example of FIG. 2, each channel may be represented as a 2D data structure, having a first spatial dimension (e.g., height H1) and a second spatial dimension (e.g., width W1).

Input 20 may be processed using a set of kernels or filters, for example a multidimensional kernel tensor 12. Kernel tensor 12 may include D2 (in this example, four) filters, each having D1 (in this example, three) kernels, one for each input channel. Each kernel (in this example, D1*D2=12) of kernel tensor 12 may have two spatial dimensions, e.g., width W2 and height H2. Thus tensor column may be characterized by a data structure that may have at least four dimensions: a width spatial dimension (e.g., indexed by a width index w, $1=<w=<W2$); a height spatial dimension (e.g., indexed by a height index h, $1=<h=<H2$); a kernel dimension (e.g., indexed by a kernel index KI, $1=<KI=<D1$); and a filter dimension (e.g., indexed by a filter index FI, $1=<FI=<D2$).

Each kernel may be applied to each of a number of spatial positions or tiles of the corresponding channel, multiplying every entry in the kernel with every entry in the input, and summing the result. The results across the D1 kernels are then summed. The result of this summation may undergo an activation function, and finally result in a corresponding output element in one of the D2 output planes (corresponding to each filter).

Matrix sparsity may improve NN processing. A matrix may be said to be sparse if it contains a large portion of entries that are nullified, or have zero value. During matrix multiplication, if the computations related to the zero elements are never performed, then the overall computation may be reduced if one could branch accordingly: execute the multiplication if the matrix entry is non-zero, or do nothing if it is zero. In some embodiments, the avoidance of performing operations on zero elements may be achieved in a manner other than branching, such as compilation which does not include instructions for zero elements (in general: some instructions may by chance be issued for zero elements). Many of the connections or weights in kernels can be nullified without adversely (e.g., beyond a predefined threshold) affecting the accuracy of the NN.

Embodiments may nullify weights of a NN following a predefined pattern, possibly set so as to comply with, or accommodate one or more parameters of an architecture of a computing device (e.g., element 1 of FIG. 1) that may execute the NN. The predefined pattern may be set so as to comply with, or accommodate one or more parameters of at least one vector or vectoral instruction that may be employed during execution of the NN. Group size of non-sparse entries may be determined or set by parameters of the target architecture or instructions used on that architecture.

Embodiments may produce, from the at least one kernel matrix 12, a second version of kernel matrix 12. A second version of kernel matrix 12 may be a group-pruned version of kernel matrix 12. A NN may include a sequence of kernels, each including a plurality of NN elements, and each such NN element may be assigned a weight. In pruned NNs, some kernels may be considered sparse, in the sense that a predefined potions of the weight values are set to null (e.g., zero). For example, a 90% sparse NN convolution layer may have 90% of its weights equal to zero. As a result, loading these values into a vector register by using a vectorized load function or a broadcast function will introduce useless values into the vector register.

Embodiments may "pack" non-zero values in for example an input (e.g. B) matrix together, while preserving the original indices of the non-zero values, so that their original locations could later be reproduced. For example, an embodiment may apply a Compressed Sparse Row (CSR) algorithm, as known in the art, to compress input data. Embodiments may improve processing as such compression or packing may use, during decompression, instructions which may occupy an instruction cache, and embodiments which reduce the number of multiply-add instructions in such a cache may allow both types of instructions to coexist in the cache.

Embodiments of the invention may be adapted to gradually nullify NN elements of at least one NN layer of a NN model. Group-pruning of NN elements included in a kernel may thus produce a sparse version of a NN model. The set of weights pertaining to each layer (e.g., at each convolutional layer) of the NN may be represented or described as a multidimensional kernel tensor element, pertaining to that layer. According to some embodiments, the process of nullifying weights from a neural network may be performed on a layer-by layer basis. For example, weights, kernels and/or filters of kernel tensor element, pertaining to a specific layer (e.g., a convolutional layer) of a NN model may be nullified via a thresholding procedure, by which all weights or filters that have a norm value below a predefined threshold may be assigned a null value and thus be nullified or eliminated. It may be appreciated that a variety of processes may exist for choosing the threshold value under which weights of the kernel tensor may be pruned. Embodiments of the disclosed subject matter, as elaborated herein, may be independent of any such process for selecting a threshold.

A group sparsification process according to some embodiments may start from a fully-trained, dense variant of the network (e.g. with kernels having relatively few zeros, compared to a sparse version), taking into account a group or block size and shape, and a desired target sparsity ratio for each layer. A group of block size g may be based on or determined by the target architecture, e.g. the size of registers or parameters of an FMA instruction. While a group size may be expressed in examples herein as a one-dimensional group along a row, a group may have multiple dimensions, for example a three-dimensional tensor. An example algorithm may operate on an original network which may be a fully-trained, dense variant of the model to sparsify, with T (e.g. a unitless percentage) being the target sparsity threshold for each layer, and/or S a fixed number of pruning steps it is desired to perform to reach the target sparsity ratio. Initially, the set of pruned weights in each layer may be empty. An example algorithm is shown in Table 1 (other operations may be used):

For each training step:
If this a pruning step, then for each layer do:
1. Compute the target sparsity threshold for the layer at step.
2. WG is the number of extra weight groups which should be thresholded and zeroed or removed in this step in order to reach the threshold
3. Sort the not-yet-pruned groups in descending order by a standard value such as their absolute norm value, resolving ties arbitrarily.
4. Remove the bottom WG weight groups from the network, and set the entries in the groups to zero// Weights in these groups have value 0 for the forward network pass and are not updated as part of the backward pass.

Perform optimization of the non-marked network weights via backpropagation.
Table 1 (Group Sparsification Example)

Other or different operations may be used. After such a process of group pruning and training a resulting network may include non-zero weights which are always in groups of at most G consecutive weights. Within such groups of non-zero weights, there may be some zero weights: within the group there may be some very low sparsity. All values outside of groups may be zero. In some embodiments group size G can be as small as 2 and as large as 16, or even more.

A different target sparsity threshold may be determined for each layer. Some embodiments may compute the amount of computation (e.g. FLOPS, "floating point operations per second") or the compute/memory ratio for a layer, and define sparsity to maximize either of these parameters during sparsification. An embodiment may execute the NN dense, find parameters such as compute/memory for each layer, and then sparsify to minimize or maximize the relevant parameter. A goal for the parameter may be fixed beforehand, or a process may find a maximum that can be reached during repetitions.

Each group may be evaluated by a standard value such as the absolute norm value of the elements in the group, determining how far the values in the group are from zero, or another evaluation value which evaluates the group as a whole based on characteristics of its elements. Groups may be sorted by such an evaluation.

Sparsification of NN kernel elements may be performed iteratively, where each iteration may include nullification of NN elements of a portion of the arrays, and retraining of the kernel. Group-pruning and retraining may be repeated iteratively, so as to diminish the number of arrays which include non-zero elements, until a stop condition is met. A stop condition may be for example, reaching a predefined number of pruned blocks or a target sparsity ratio (a ratio between the number of zero-valued NN elements, and the total number of NN elements) in a group-pruned kernel, reaching a predefined level of accuracy of a NN, and/or any combination thereof. Embodiments may also quantize NN data, diminishing a representation (e.g., in bits) of an NN element or of a weight of an NN element, or lowering the resolution of the number or the number of bits used to represent the number.

Figure 3:
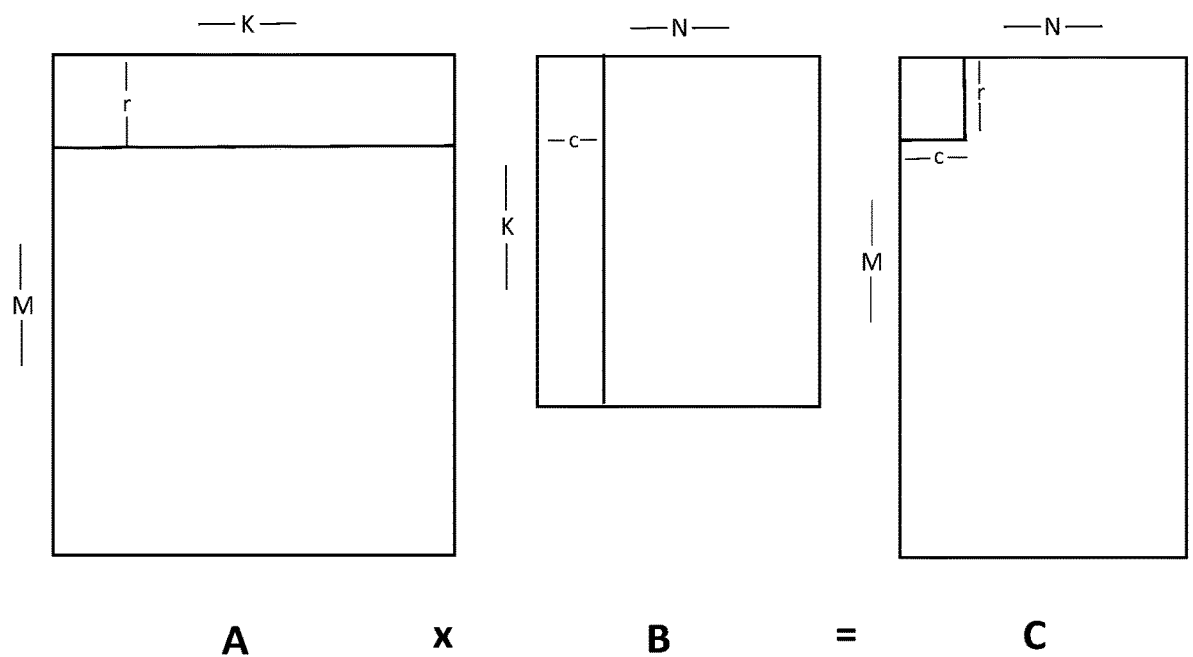
FIG. 3 is a high-level view of the multiplication of a block of a kernel A by a block of input B to produce a matching block of output C according to an embodiment of the invention.

FIG. 3 is a high level view of the multiplication of a block of A of depth M by a block of B of width N to produce an output block of C of size M*N using non-zero weight embedded full loop unrolling, according to some embodiments. In FIG. 3, A is a kernel matrix, B is input (e.g. input data to a NN, or the output of a NN layer which is input to another layer), and C is the result of the matrix multiplication which is used to produce the output of a layer. Multiplication of a block (e.g., a subset) of A by a block or subset of B produces a portion an output matrix C. A may be both group sparsified and may be encoded into instructions (e.g. FMA instructions) by embedding the weights of A into the code (e.g. "unrolling"). Such instructions when executed may be designed to fit into cache, by being designed with the target architecture's cache policies. The data related to such unrolled instructions (e.g. a .data section) may be for example placed consecutively into the L1-data cache, typically after being loaded from memory (e.g. from a .data section associated with the unrolled code). Each weight, element or operand in A may be multiplied by a vector of size c in a column of B and accumulated into a vector of size c in C.

One embodiment uses a compiler such as a just-in-time (JIT) compiler to generate code (e.g. assembly code) that iterates first over r-row bands of size c in an output matrix (e.g. C), second over c-column blocks within that band, and third over the corresponding non-zero elements of a sparse kernel matrix (e.g. A) and the corresponding elements of an input matrix (e.g. B). Produced instructions may include vector (e.g. FMA) instructions and other instructions such as broadcast instructions. The loops of FMA instructions may thus be fully unrolled, that is, all the FMA instructions may be issued or emitted by the compiler (e.g. a JIT) to be executed. In some prior art systems all non-zero kernel elements may produce an FMA or other instruction and each such FMA is used once without re-use. Embodiments of the present invention may provide an improvement by allowing fewer FMAs or other instructions to be produced, lowering cache or memory usage, and allowing for re-use of such instructions. While in embodiments discussed herein the parameters which are group-sparsified are in a kernel matrix, in other embodiments, a different set of weights or NN parameters may be group sparsified, and code as in the example Tables herein may use such group-sparsified non-kernel elements.

An example of such code, which may be termed "sparse GEMM", includes the example operations (other operations may be used) shown in Table 2:
1: for each band of r rows in C (in any order) and c elements in each row//band is r depth and c width, e.g. r registers of size c
2: for each non-zero element e in the corresponding r x K band in A (in some well-chosen order)://K dimension of group
multiply e by the corresponding vector(s) in the corresponding K×c column of B and add the result to the corresponding width c elements in C//Width in C is c
Table 2 (Example Execution of GEMM)

Such an algorithm may be performed by code generated by other code. Other or different operations may be used. The code in Table 2 may be a series of instructions with loops shown in Table 2 being effected by repeated blocks of instruction: thus the "for each" loops may not appear as loop instructions in the code of Table 2; e.g. the code may be fully unrolled so in the actual execution there is no loop, rather a series of instructions. In the code in Table 2, A may be all or a portion of a group-sparse kernel; B may be all or a part of input, and C may be all or part of output, such that A×B=C. A "band" may be a portion of a matrix, e.g. a series of sections of rows or columns, row or column wise, in a portion of a matrix or tensor.

Figure 4:
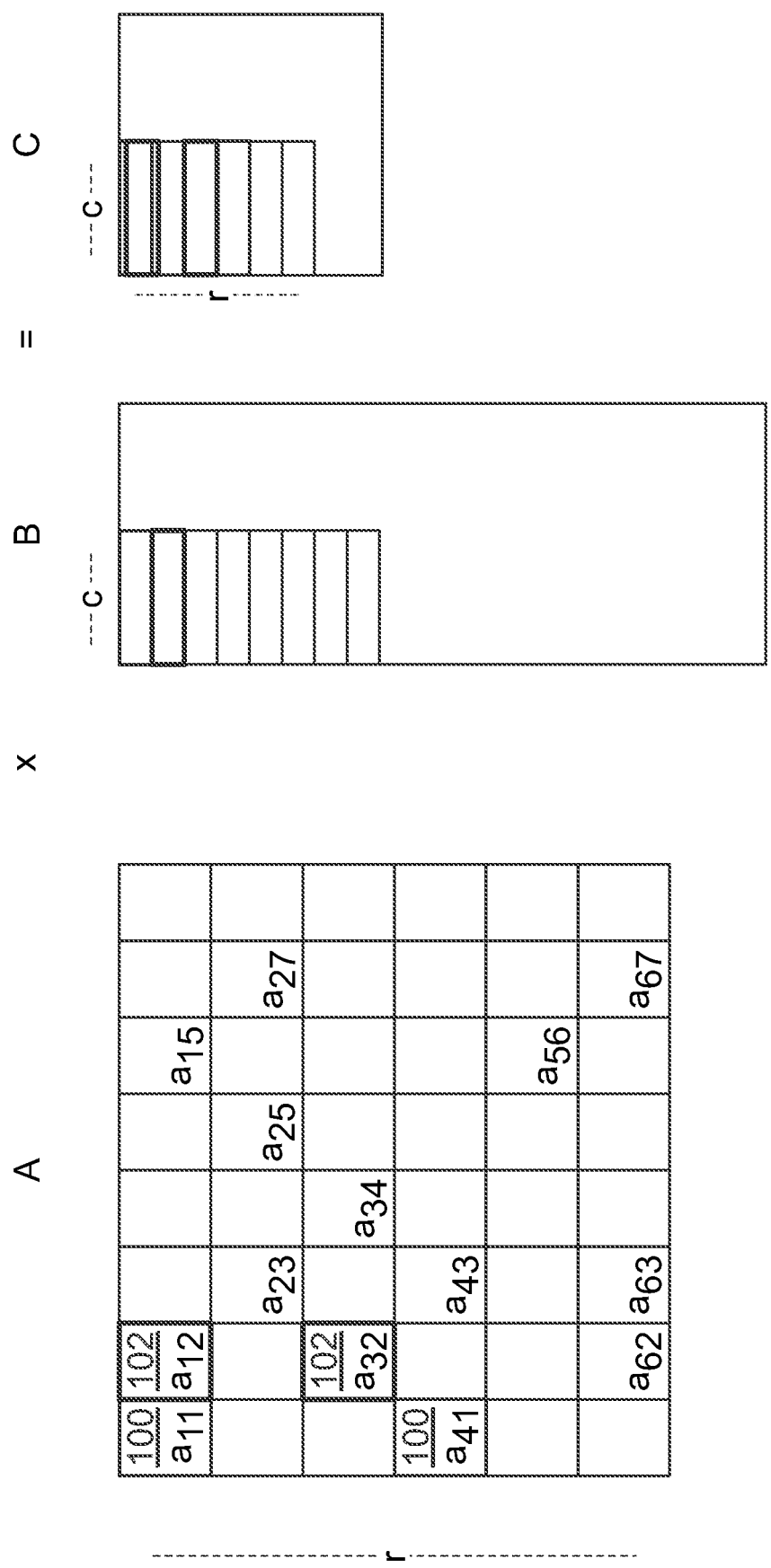
FIG. 4 depicts a matrix multiplication operation with a sparse, but not group-sparse, kernel, having random sparsity.

FIG. 4 depicts a matrix multiplication operation with a sparse, but not group-sparse, kernel, having seemingly random sparsity. Code such as in Table 2 may operate on a sparse kernel A which is not group sparsified, and such code would operate more efficiently than in the prior art. For example, inner loop 2 in Table 2 may execute to deliver good cache performance and effective use of the CPU's vector multiply operation (e.g. FMA) registers. In an example not using group sparsity, for each non-zero value in the band of r rows of A, an FMA will be issued by the example a compiler issuing multiply-add instructions only for non-zero elements and not issuing such instruction for zero elements (e.g. a JIT compiler). There may be some number r of registers allocated for reading and accumulating values in C, and some number of registers allocated for reading values in B. The order of traversal of the non-zeros in A can for example be to go over each of the columns of the band of A one after the other, executing all the vector multiply operations for non-zeros in that column, where each vector multiply operation multiplies the non-zero value, pre-loaded into the same consecutive region of the L1-data cache starting from some base location. Thus, in the first iteration of the loop, denoted by squares 100, two values of A $a_{11}$ and $a_{41}$ will be multiplied by the same c width vector in row 1 of B and added to the two width c vectors in rows 1 and 4 in C, each in a separate pre-allocated register. The next iteration (squares labelled 102) of the loop will do the same for values in $a_{12}$ and $a_{32}$ multiplying by the vector in the second row of B and accumulating the result accordingly into the vectors in the registers corresponding to rows 1 and 3 in C. There may be good parallelism between the vector operations (e.g. FMAs) in the separate loop iterations as they read from the same value of B but accumulate/write to separate registers in C. This may not be true between the FMAs in the first and second loop iterations. $a_{11}$ and $a_{12}$ are both accumulating into the same register in C and thus conflict and thus typically will be executed one after the other. However, even in this type of execution there may be enough parallelism.

However, in this type of execution (e.g. of a sparse GEMM based on non-zero weight loop unrolling), there may be instruction pressure on a cache (e.g. an L1-i instruction cache) due to the large number of different FMA instructions that typically should be brought in and executed in the example Loop 2 of Table 2 (these loops may be fully unrolled so in the actual execution there is no loop), essentially one FMA instruction per non-zero weight in the kernel represented by matrix A being multiplied. Embodiments of the present invention provide improvement by providing reuse of the instructions in this inner loop so the total number of instructions brought into cache (e.g. L1-i cache) is reduced. This is especially important if one wishes to add additional performance improvements to the kernel, for example by using compression of values in B or similar techniques. The process of uncompressing values may introduce additional instructions and dependencies which would benefit from an overall reduction of the number of instructions that need to be kept in the instruction cache.

Similarly, in a matrix multiplication (e.g. GEMM) execution based on CSR compression rather than non-zero weight loop unrolling, there may be instruction pressure on the cache (e.g. L1-i instruction cache) and the indirection may have to be performed per instruction in Loop 2 in Table 2, one additional indirect load instruction per non-zero weight in the kernel matrix A being multiplied. It would be helpful to have non-zero values consecutive as this may reduce the amount of indirection needed to read values into memory.

Embodiments of the present invention may replace some number of vector instructions (e.g. FMA instructions) that are fully unrolled by a compiler with instructions that are reused. Embodiments may add a small actual execution time loop (a loop executed at execution time, rather than compile time) within code such as unrolled loop 2 in Table 2, that reuses some of the instructions (e.g. FMAs) from one iteration to the next. In other words, an embodiment may keep the level of FMA unrolling proportional to the number N of non-zero weights in kernel (e.g. A), but reduce it from being exactly N to being N/g for some small constant g (g typically being the size of the groups of non-zero weights created).

In the case of completely arbitrary (e.g. appearing as random) sparsity in kernels, as in the case of matrix A in FIG. 4, it may appear to be difficult to find a way to reuse the instructions (e.g. FMA instructions) in a loop because the non-zeros are arbitrarily scattered and there is no real repetitive structure that can be used. As the process loops through the FMAs in the inner Loop 2 of the matrix multiplication in example Table 2, every iteration may have a different number of operations with values in varying distances from one another.

Figure 5:
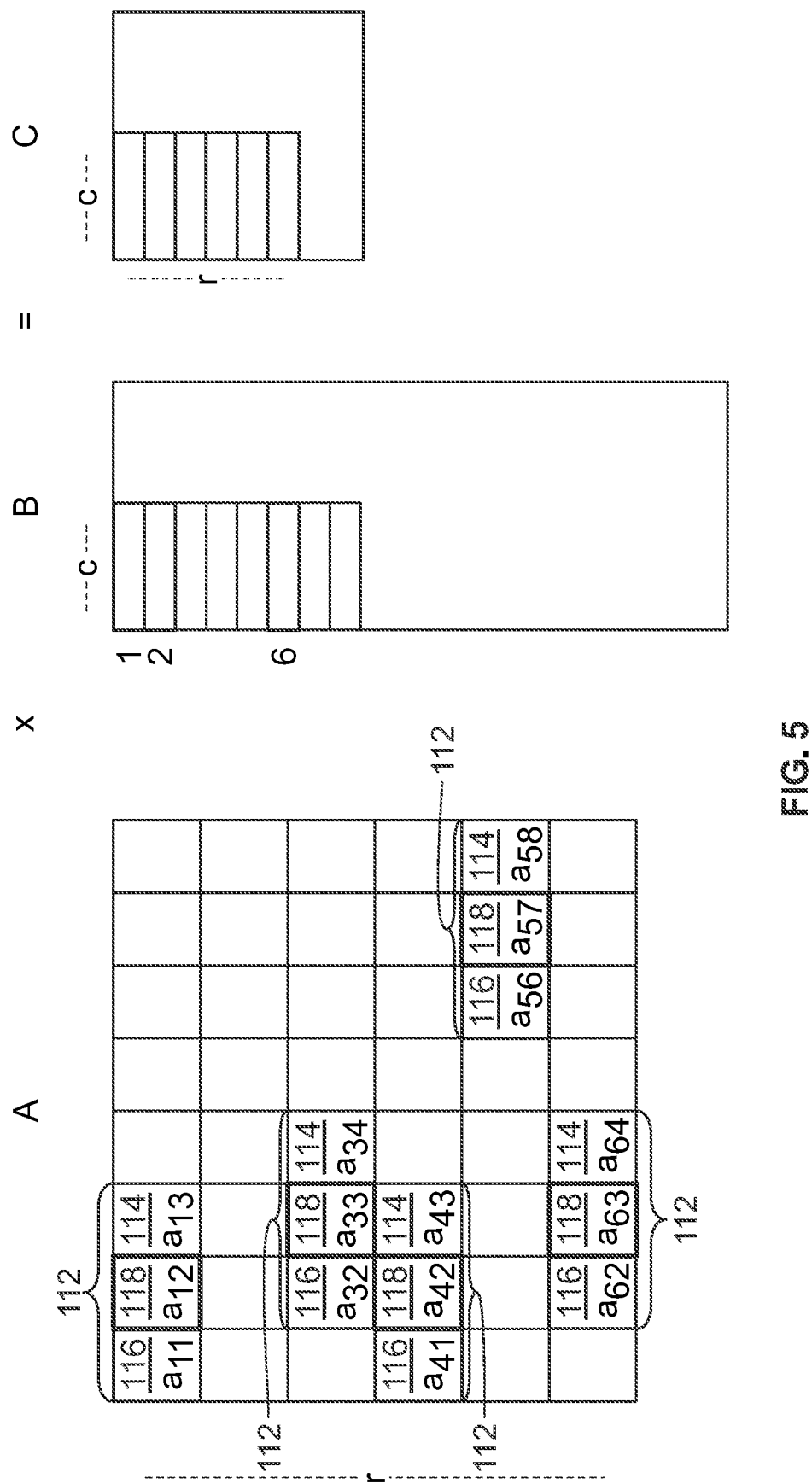
FIG. 5 depicts multiplication using a group-sparse kernel according to an embodiment of the present invention.

FIG. 5 depicts multiplication using a group-sparse kernel according to an embodiment of the present invention. FIG. 5 shows an example kernel matrix A in which all non-zero values are in groups 112 of 3 exactly consecutive non-zero values 116, 118 and 114 (note some groups may occasionally include a zero value, e.g. if the original kernel had a zero in that position). In sparse matrix A unlabeled boxes are outside of groups and have zero entries. A front or frontier may be used, and values 116 of A may form or define the front or frontier. While in FIG. 5 and elsewhere a specific grouping is shown, other groupings with other dimensions and arrangements may be used. Groups created typically are all of the same size g (in the case of a one-dimensional group) except for the occasional group having a zero at the beginning or end. An embodiment may reduce the number of instructions (e.g. FMAs) in cache if the kernel matrix A has group structured sparsity, that is, the non-zero values are grouped into consecutive sequences of size g (in one embodiment keeping the number of groups as close as possible to the minimal number of such groups (sequences) that would contain all the non-zero values in A).

An embodiment may prune or sparsify a dense or original kernel, and train the NN with the resulting group sparse kernel, while minimizing the number of groups (subject to constraints such as accuracy) and maintaining a size g of consecutive values constant across all groups. The typical group includes g consecutive non-zero numbers, but groups may occasionally include some zeros. While one-dimensional groups are depicted herein, groups may include multiple dimensions. In the example in FIG. 5, all non-zero elements in kernel A are in groups of 3. Some rows of the kernel could have no such sequences. It is possible to have sequences shorter than 3 if some groups include zeros. FIG. 5 depicts only one group of consecutive values per row in A but this need not be the case.

One embodiment may use a front or frontier traversal in Loop 2 based on the example code in Table 2 (or in other code, according to some embodiments). Instead of a simple execution of the front, after which one moves to the next, possibly different front, an embodiment may reuse the multiply (e.g. FMA) instructions from one iteration of the front to the next one. Such an embodiment may produce matrix multiplication code which operates using an order of traversal in code such as inner loop 2 in Table 2 to go over the r rows of kernel A, finding in each row the first non-zero element, or the column in which the first non-zero element appears (if one exists in that given row). This creates a frontier or front of r or less multiplication (e.g. FMA) instructions that is recorded (and which can be issued by a compiler, e.g. a JIT).

The position of the frontier or front may be inherently recorded as parameters of the FMA or other matrix multiply instructions produced: each FMA records the position of the beginning of the frontier. Alternately, the position of the frontier, e.g. the position of the first non-zero element or group in each row, may be recorded in an array, e.g. array offset (r) in Table 4. In the case of a multi-dimensional group, the start of each group in each line or row of each dimension may be recorded. For example, the values or operands 116 (e.g. the first each for each group 112) of A in FIG. 5 form a front. An embodiment may execute this front repeatedly g times in a loop (e.g. g=3 in the example depicted), where the values of A to be used in each iteration are placed, for example in cache (e.g. an L1-data cache) in the order of the loop, that is, the first r values corresponding to the entries 116, then in the next iteration r values corresponding to the immediately subsequent entries 118, then subsequent entries in the groups if any, etc. In these vectors (a one dimensional group may be a vector) there may be some 0 values (e.g. if the original kernel included a zero) and a 0 may be placed in cache (e.g. the L1-data cache) for these 0 weights, so that the structure in the L1-data cache may be exactly r sequences of g values each. The vector values of B used may be simply shifted by 1 down the column and the vector locations of C may be unchanged from one iteration of the front to the next. While placing data in a cache is discussed herein, embodiments may operate without all or some data or instructions being placed in a cache. Data may be placed in the cache by designing the code so that the target architecture's cache policy places data in a cache in response to a memory access.

An example algorithm to generate the matrix or vector multiply sequences and loops to implement this approach is shown in Table 3 (other operations may be used):

While A (e.g. kernel of convolutional layer) contains unvisited non-zero elements do:
1. determine and issue a frontier of r FMA instructions of unvisited non-zero elements in A, each value being the first unvisited non-zero element in its respective row, each with a corresponding vector of values of B (input) and a vector of values of C (e.g. as in the sparse GEMM algorithm example in Table 2); and record position of frontier for each row//position of frontier may be recorded in instructions themselves, or a data structure.
2. emit or generate a loop with index i from 0 to g-1 in each iteration repeatedly executing the frontier of r FMAs (with a no-op, no operation, if no FMA was determined for that row in the frontier), each FMA in row j of the frontier with://g is group size:
   a. value in A from location base+i*r+j in the L1-data cache and//other cache may be used; base is the start position of the group of non-zero entries, and is also the start of the frontier within the row of A
   b. a value of vector B shifted down by 1 location in the column and
   c. value of C register (output) remaining unchanged.
3. mark all the non-zero elements of A touched by the loop as visited. end while;

Table 3 (Example Generation of Group Sparse GEMM Code)

While FMA instructions are given as an example, other vector multiply, or multiply and add, instructions may be used. A process such as in Table 3 may be a compiler which produces code which executes a NN. The parameter g, which dictates how many times the loop will be generated, is typically the size of the groups of non-zero elements or operands in the group-sparse matrix. The groups of g elements are mostly non-zero: in some embodiments a zero element or operand may be occasionally included, if for example the original kernel value was by chance zero. In the case a VNNI instruction is used, the shift in B may be the width in operands of the VNNI operation. Multiple frontiers may be generated, and thus the next unvisited non-zero may be the start of the next frontier. In such a case "record position of frontier for each row" may be executed for the new frontier, e.g. the groups subsequent to the groups to create the previous frontier, and "emit or generate a loop . . . " may be executed for the subsequent frontier.

A series of multiply-add or vector instructions may be issued or created, each instruction corresponding to the first non-zero element or operand of one of the rows. Thus the frontier of r FMAs may be generated by determining the first non-zero in each row and generating an FMA corresponding to the non-zero. Code may compile, create or generate a loop which when executed executes a series of instructions such as g times a number r of vector or matrix multiply instructions (e.g. multiply and add instructions such as FMAs). Thus, the code generated by Table 3, when executed, may execute a loop, where during each iteration of the loop, a series of matrix or vector multiply, or multiply and add, instructions is executed. Within each individual iteration, each multiply and add or FMA instruction in the series of multiply and add instructions takes input from or corresponds to an entry in a different row of matrix A. Each iteration in the loop may have a number or index (e.g. 0 to g-1) which may index the operand or element within the kernel group being operated on by the specific multiply and add or other instructions executed in that iteration, such that the position of the operand or element is correlated to, or defined by, the iteration number of the loop. For example, on iteration X, an operand operated on by an FMA may be kernel operand or element row selected from r, column base+X, where base is the offset or start of the non-sparse group within the row r. The parameter r may be the number of rows of a kernel A, or a section of the kernel. The "determine a frontier of r FMAs of unvisited non-zero elements . . . " may be done multiple times if there are multiple groups of non-zero elements.

Embodiments may create multidimensional sparse groups, e.g. a two-dimensional matrix or three-dimensional tensor. A different frontier may be executed once per dimension.

A set of code produced by a process as in Table 3 may be created, in different form each time, each for different a convolutional or other layer in a NN. Code produced by a process as in Table 3 may be integrated as a part of other code executing a NN. Code produced by a process as in Table 3 may when executed carry out the series of example operations as in Table 4:

For each frontier:
  For each i from 0 to g-1//loop over g, the size of the non-zero group
    For each row r in kernel A://in some order
      Execute a multiply-add (e.g. FMA) on kernel A operand at row r, column offset (r)+i and input (B) operand the offset (r)+i row of B//offset is the list of frontier locations such that offset (r) is position of frontier for row r, e.g. the first non-zero for row r in A; no-op for row r if no non-zero group in row r Table 4 (Example Execution of Group Sparse GEMM)

Code as in Table 4, produced by a process such as in Table 3, may execute a loop including a series of multiply and add instructions (e.g. FMA, or vector instructions) to multiply a kernel matrix A by an input. On each iteration of the loop the series of multiply and add instructions are executed as a frontier advancing down a group of non-sparse entries in the kernel, indexed by the iteration number. The position within each row of the matrix A element or operand operated on by each multiply and add instruction in the series is correlated to or defined by the iteration number of the loop.

The "For each frontier:" may loop over multiple frontiers, e.g. if there are multiple groups in a row. Each frontier may have a different shape, in that the relative starting positions of groups in rows may be different between a first frontier and second frontier (separate from that a second frontier is further from the start of the row than the first).

For a kernel row having no non-zero elements, within the iteration loop, instead of a matrix or vector instruction a blank or "no-op" instruction may exist. Additional instructions may be emitted to form the loop: for example a vector broadcast instruction may be associated with each FMA instruction.

Embodiments may improve parallelization, as code operating as in example Table 4 may not cause conflicts when writing results to output C, since for each iteration within a frontier a group of FMAs is executed each writing to a different position in C. Embodiments may improve processing of sparse kernels which in the prior art may have been processed by packing non-zero values together but which required processing of indexes to these non-zero values; the regular repeating pattern of non-zeros, one after another in groups, according to embodiments of the present invention, may avoid the need for indices.

Registers may be allocated depending on the target architecture intended to generate the code. An example of a possible register allocation scheme for the above algorithm for AVX2/AVX512 processor architecture includes that a set of vector registers are allocated for holding the accumulated results for matrix C, a set of vector registers are allocated for broadcasting non-zero values of matrix A, and then accesses to the matrix B can be done via a pointer. The pointer may include "base"+ "offset" (no registers used), where the "offset" is incremented in each loop iteration and the next A non-zero values are broadcast into the vector registers (that are used for broadcasting). A different approach is to use registers for C and B and access the A non-zero values via a pointer with "base"+ "offset".

In FIG. 5, values or elements 116 in A may form a front and may be the elements for which vector operations such as FMAs are executed in the first iteration of the loop in Table 3. The B vectors corresponding to rows 1, 2 and 6 in the specific example in FIG. 5 correspond to the starting columns of the front. The C vector values in C rows 1, 3, 4, 5 and 6 correspond to the rows of A that have non-zero elements in the first elements of the front. Each entry in row X of matrix B corresponds to or is used to create an entry in row X of matrix C. If a non-VNNI FMA is used one entry in row X, column Y in B corresponds to an entry at row X, column Y in C, but VNNI operations may operate on multiple entries in row X of matrix B, writing values to multiple entries in row X of matrix C. Since row 2 of A has no elements, it does not have a corresponding C vector. During a second iteration of the front defined by elements 116, elements 118 in A may be multiplied by B vectors corresponding to rows 2, 3 and 6 in B and be written to C rows 1, 3, 4, 5 and 6. Embodiments of the present invention may improve NN operation by allowing for maximum parallelism across multiple instructions executed as part of a frontier (in that the write output to C does not conflict among the instructions) and also reuse of the same instruction across multiple iterations of the frontier. This may cause less instructions to need to be stored.

Figure 6:
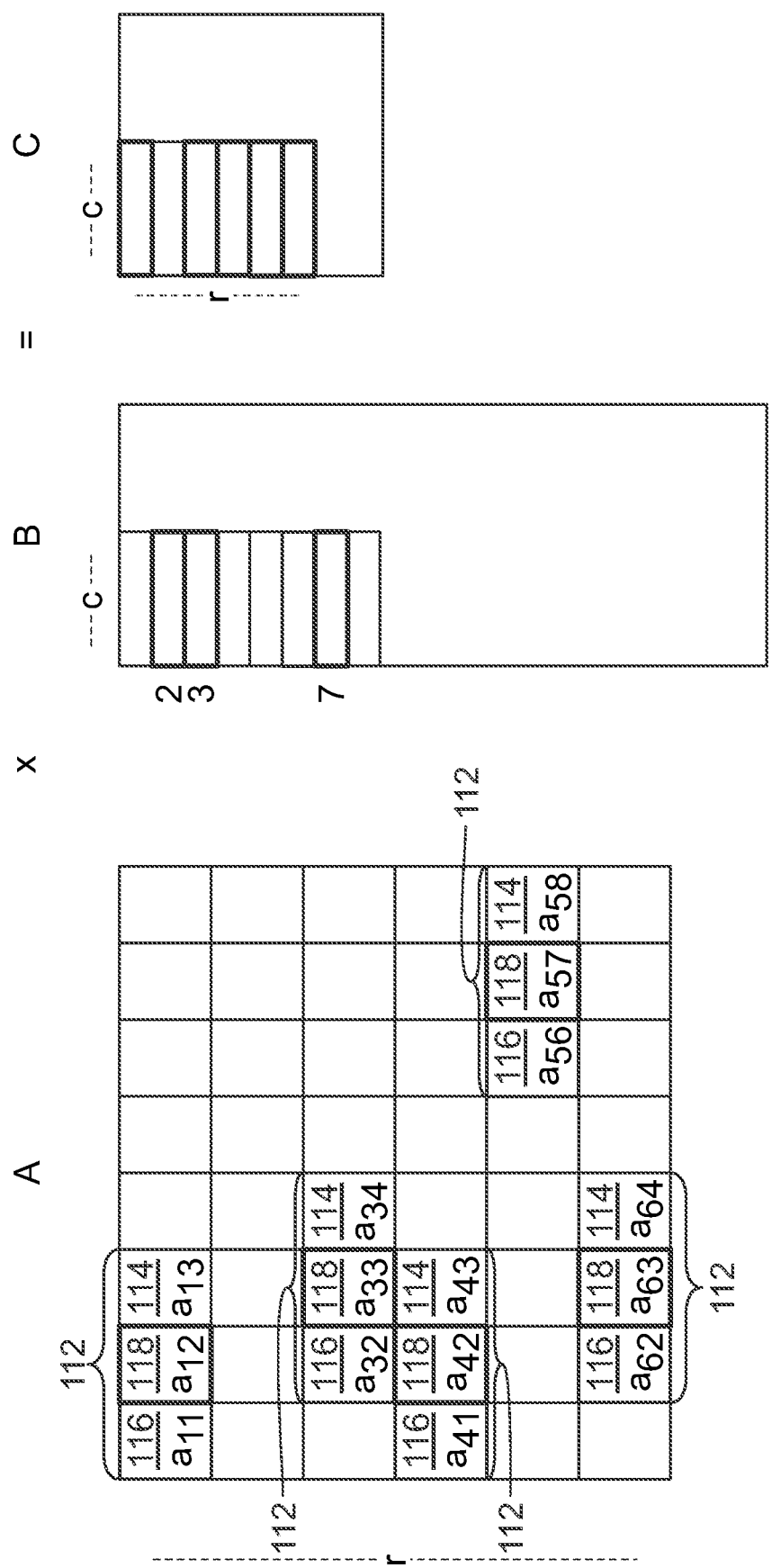
FIG. 6 depicts multiplication using a group-sparse kernel according to an embodiment of the present invention.

FIG. 6 depicts multiplication using a group-sparse kernel according to an embodiment of the present invention. Elements 116 are the first elements of each group, defining the frontier. In the second iteration vector operations such as FMAs for the elements 118 (the second elements in each group) are executed, and in the third iteration elements 114. The values of the elements of A may be found in consecutive locations in a cache such as the L1-data cache. The vectors of B are shifted by 1 to rows 2, 3 and 7, while the vectors of C accumulated into remain unchanged. The final g=3 execution of the loop would again have the B's move one forward and write to the same C locations.

Such a sequence of operations achieves a reuse pattern for the instructions (e.g. FMAs) where the same C vector registers, which in some embodiments cannot be "iterated on" because the process may accumulate or write into them, are used, while the values of the A's and the B's are laid out consecutively in memory and accessed with a simple loop iteration that only requires one additional loop index register.

Since in some embodiments consecutive non-zero values exist in a row, one solution may be to simply iterate down the row, then the next row, etc. However, the dependency of the vector multiply instructions (e.g. FMAs) in a given row may benefit from a different solution. The benefit of instruction parallelism may result from eliminating dependencies of FMA or other instructions that need to write the same C registers. Thus some embodiments may use a front or frontier and then iterate over this frontier in a loop.

The size of groups (e.g. g) may be determined through various methods, such as a trial-and-error method which determines the best group size for the particular NN, e.g. the group size resulting in fastest execution or best memory usage while maintaining a target accuracy. Group size may be determined during repeated optimization operations Such operations may work with various types of vector operations, e.g. AVX2, AVX512, Bfloat, FP32, FP16 vector operations, or other operations, as well as simple non-vectorized operations (where a process loops over c values instead of a vector operation). The size of the groups used in the sparsification of the kernel matrix A may be a machine learning (ML) or NN consideration that has to do with accuracy and other ML parameters used in the pruning process or the kernels. For example, a process may experiment with different group sizes to determine how well the resulting NNs with different group sizes perform. The process may repeat until a group size is determined. The larger the grouping, the harder it is to sparsify the kernels; but more instruction (e.g. FMA reuse) is obtained and thus fewer FMA instructions need to be issued, and thus usually performance is improved on sparse matrix multiplication. In an example target architecture of AVX512 VNNI sparse quantization, at for example 8-bits or 16-bits, functionality in addition to that used with non-VNNI instructions may be needed. A trial-and-error or optimization method may be used with non-VNNI instructions, e.g. where a single FMA or other multiply-add operation operates on one destination element in output matrix C at one time.

If a VNNI or other multiple element operation is used, group size may be based on a parameter of a multiply and add instruction, such as the dimensions of the VNNI parameter. The size of the group may be the VNNI resolution (e.g. number of bits in each VNNI operand, or element) divided by the number of bits in each location in A (which may be affected by quantization). For example, if the VNNI size is 32 bits, and each value or element in A is represented by 8 bits, group size is 32/8=4. The number bits in the VNNI operand divided by the number of bits in the quantized operand may be the group size. If the VNNI operand has 32 bits, and the quantization requires four bits for an operand, the group size may be 32/4=8.

If VNNI is used with a front or frontier such that multiple iterations operate over one group, group size may be ((number bits in the word on which the FMA opearates)/(number of bits in the quantized operand))*(iterations of frontier). For a VNNI operand size of 32 bits; a kernel operand size of 8 bits; and two iterations, the group may be 8: (32/8)*2. If VNNI is used with a front or frontier the group size g may be expressed as (iterations)/(width of quantized word used in the VNNI operation); thus a group size of 8, where the VNNI operates on 4 operands (for example 32 bits total and 8 bits per operand), two iterations may be used.

Dimensions of the groups or arrays (e.g. g) may be defined by the at least one parameter of the vectoral operation used (e.g. FMA, VNNI) in other manners.

VNNI operations, such as AVX512 VNNI operations implemented on Intel processors, provide the ability to vectorize or divide the (for example) 512 bits used by the instruction into 64×8 bit integer values. The VNNI FMA instructions allow multiplying four 8-bit values in a 32 bit word by four 8-bit values in each of 16 32-bit words of a 512-bit VNNI FMA register, and then accumulating all four of them into the 16 corresponding 32-bit words in another VNNI FMA register. Some embodiments of the present invention may use VNNI operations with group sparsity in a sparse quantized network (e.g. with quantized values represented with fewer bits than the original values). Such an implementation may use group sparsity with g=4 consecutive values in the kernels for 8-bit VNNI and g=2 for 16-bit. Other values may be used.

Figure 7:
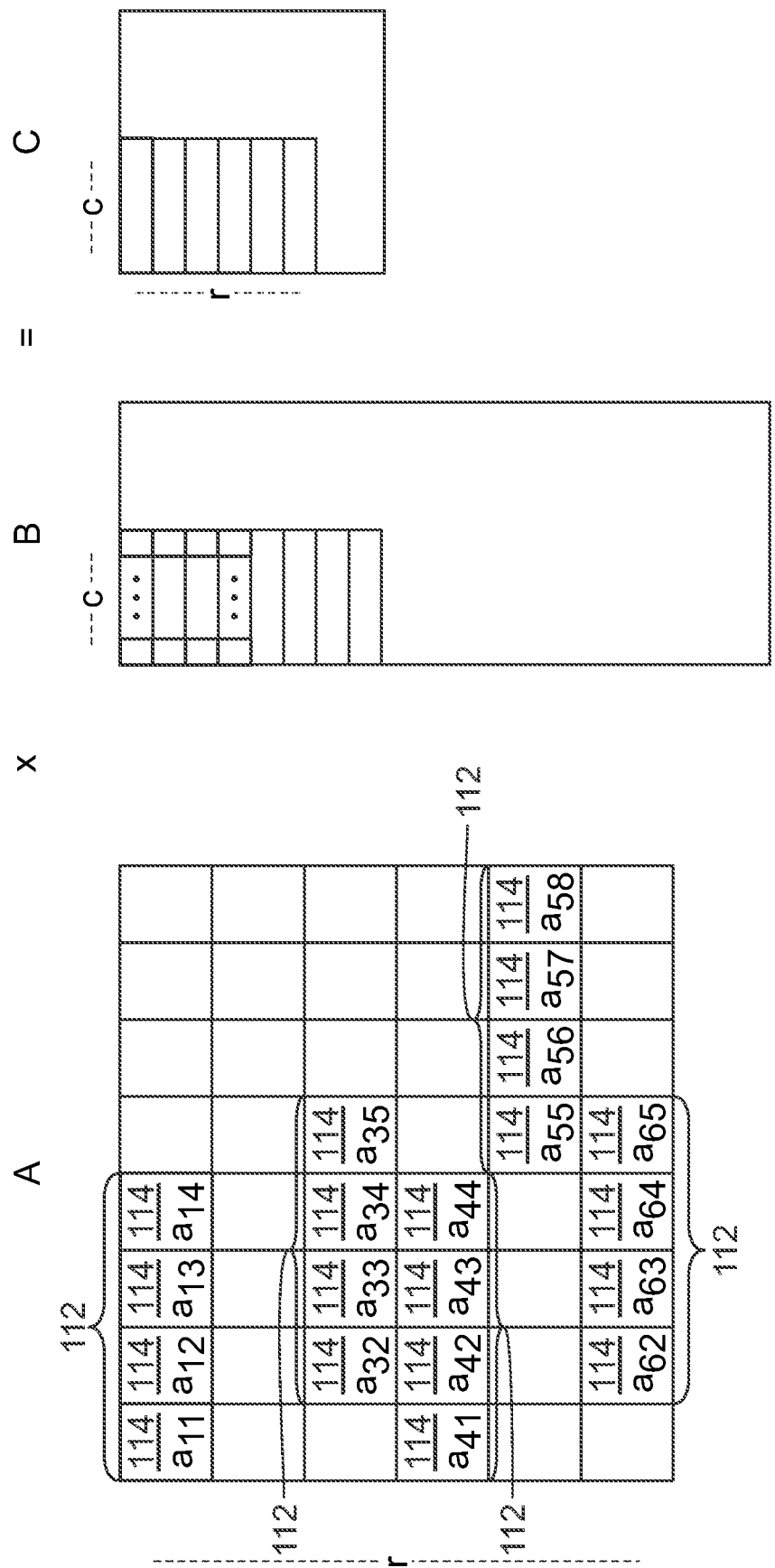
FIG. 7 depicts multiplication using a group-sparse kernel using VNNI instructions according to an embodiment of the present invention.

FIG. 7 depicts an example of multiplication using a group-sparse kernel using VNNI instructions without the use of a frontier according to an embodiment of the present invention. In FIG. 7, since no frontier is used, each VNNI instruction uses the one group in each row of kernel A. Using VNNI matrix multiplication (e.g. GEMM) execution may follow the pattern in FIG. 7, where the same four consecutive values an to $a_{11}$ are each applied across 4 rows of B and accumulated to produce c=16 32 bit values in the C registers. Each value in A and B may be quantized as 8 bits, the VNNI operand may be 32 bits, group size may be 4, and 32 bits may be used in each result entry in C to avoid overflow. A row in C may include for example 16 values each of 32 bits. The boxed first group of four values in A may be multiplied by a column of four values in B to produce four values in C.

Figure 8A:
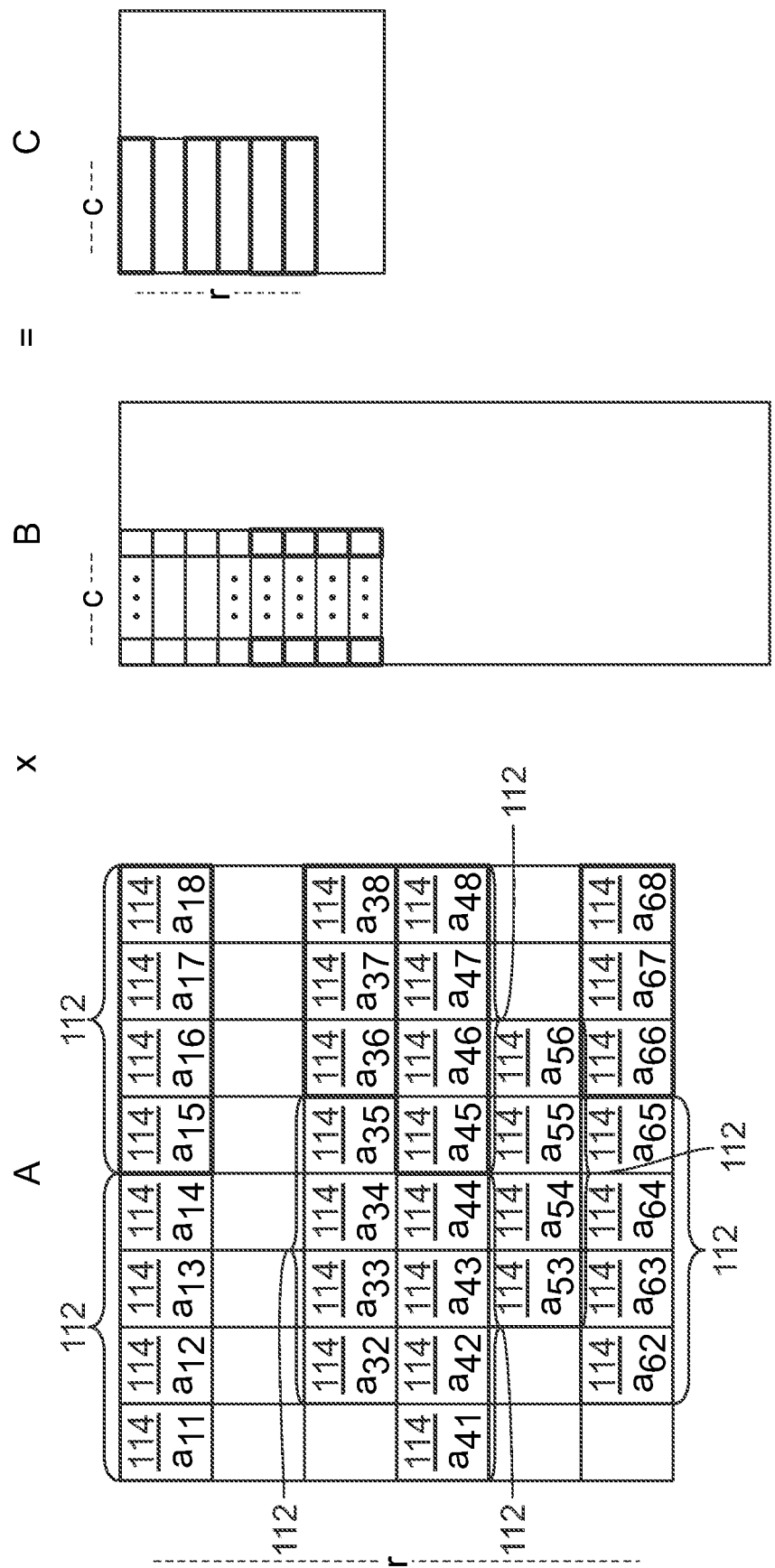
FIG. 8A depicts multiplication using a group-sparse kernel using VNNI instructions according to an embodiment of the present invention.

FIG. 8A depicts an example of multiplication using a group-sparse kernel using VNNI instructions according to an embodiment of the present invention. FIG. 8A illustrates the use of a frontier. In an embodiment using sparse quantization and VNNI operations with the looping using, e.g. FMA instructions, as described in Table 4, it may be beneficial to prune in much larger groups than when using non-VNNI FMA instructions, and have the loop structured to incorporate the VNNI FMA operations. The example in FIG. 8A depicts sparse 8-bit quantization and VNNI FMA.

Such an embodiment may prune groups of size g=8, and the loop structure may execute the VNNI based algorithm across groups of four values in kernel A. While group size may dictate the number of iterations in non-VNNI looping, in VNNI looping the number of iterations may be group size divided by the VNNI size, e.g. there may be (group size)/(VNNI size) iterations. Thus g, the loop, repetition or iteration size in the algorithms described in Table 4 may be 8/4=2 if the VNNI number of operands is 4 and the overall group is 8, as in the example in FIG. 8A. The example kernel shown in matrix A in FIG. 8A has no non-zero entries in row 5, and the second subgroup in rows 3 and 6 are truncated, as the groups extend beyond the dimensions of the matrix. The example in FIG. 8A may operate on two subgroups of size 4 for each group of size 8, with an FMA on four columns in input data B in each iteration: the first iteration may operate on subgroups 112 and the second iteration may move the frontier to operate on subgroups 112'. An embodiment that would train groups of size g=12 may have a loop that repeats 12/4=3 times.

Figure 8B:
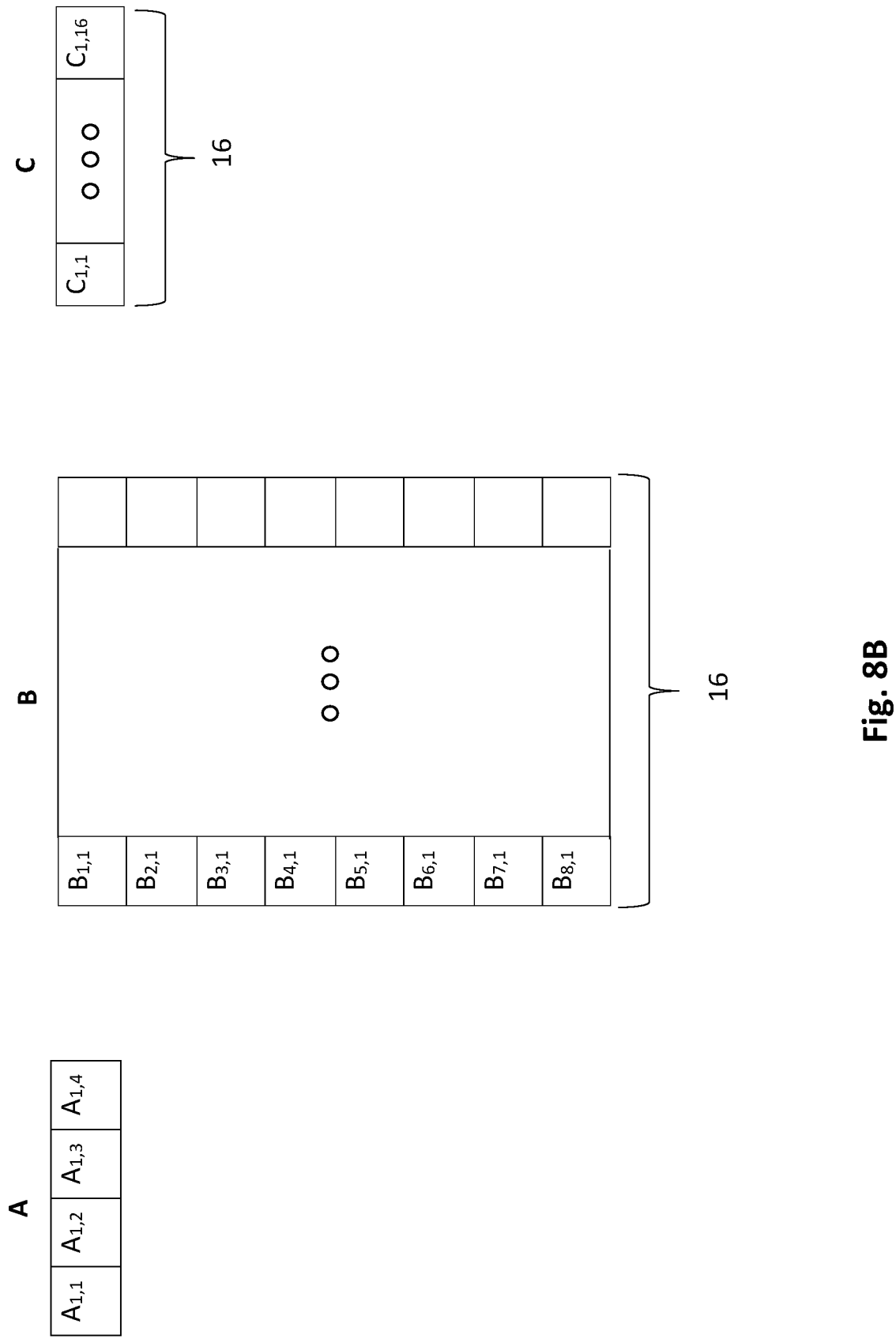
FIG. 8B depicts multiplication using a group-sparse kernel using VNNI instructions according to an embodiment of the present invention.

Referring to FIG. 8A, in a first iteration of a frontier, elements within groups 112 of sparse kernel A having group size 8 and subgroup size 4 may be multiplied by appropriate elements of input matrix B to produce output in locations in output C: since rows 1, 3, 4 and 6 have groups in A, locations in rows 1, 3, 4 and 6 are written to in C. In the first iteration, for the first row of A (as an example), elements of the first group in the first row A1,1, A1,2, A1,3 and A1,4 may be multiplied by the elements in the first four rows of B to produce outputs in the first row of C. The number of the source elements in B and destination elements in C may be defined by the particular AVX or other instruction (e.g. 16 elements in each row of B may be used as source data, and 16 elements in a row of C may be written to). Element A1,1 of kernel A may be multiplied by B1, 1 of B, and accumulated to C1, 1 of C; element A1,2 may be multiplied by B2,1 and accumulated to C1,1; element A1,1 may be multiplied by B1,2 and accumulated to C1,2; element A1,1 may be multiplied by B1,3 and accumulated to C1,3; etc. For this first iteration on the first row, 64 destinations of C are written to, if the AVX size is 16 and the group size is 4 (16×4×4). For the third row in A in the first iteration, a similar correspondence may take place, using source elements A3,2, A3,3, A3,4 and A3,5 of kernel A. For the third row of A, element A3,2 may be multiplied by B2,1 and accumulated to C3,1; etc. In the second iteration, a similar correspondence of elements (e.g. A1,5, A1,6, A1,7 and A1,8 for the first row) may be used. This can be seen by the example in FIG. 8B, showing a fragment of the operations of FIG. 8A, depicting a subset of operations according to an embodiment of the present invention.

The example in FIG. 8 describes two frontiers each with a width of two separate instructions, e.g. an iteration causes each VNNI instruction in each row to be used two times; in each iteration, each VNNI instruction in each row performs four multiply-add instructions at the same time. In the first frontier iteration operations on subsets 112 of groups of non-sparse are executed, and in the second iteration operations on the second subset 112' are executed. Each of the four values in each of groups 112 and 112' may be broadcast along a row of B. A VNNI instruction may have lower precision than other instructions such as non-VNNI FMA instructions; e.g. each element of A in a VNNI system may be represented as 8 bits rather than the 32 bits which may be used to represent A entries in a non-VNNI instruction-thus quantization may be used as part of the use of VNNI instructions.

While VNNI instructions are presented as an example, other multiple multiply-add systems (e.g. more than one multiply-add or matrix operation at once) may be used.

It may be difficult to prune groups of large sizes such as 8 or 12 without loss of accuracy. One embodiment may train larger groups that are less dense, e.g. have higher levels of sparsity inside the group. For example, to have eight non-zeros in a group, an embodiment may train with groups of 12 with approximately 66.6% sparsity within the groups (e.g. on average across groups). The result may be eight successful non-zero FMA instructions per group of 12 consecutive elements in a row of kernel A. However, because such an embodiment does not issue a new FMA per non-zero element, but rather executes a loop of size 12 as opposed to 8, this might often not result in a large performance loss (especially when the sparse multiplication is memory bound, as it often is) and one would be able to train to higher levels of accuracy.

Figure 9:
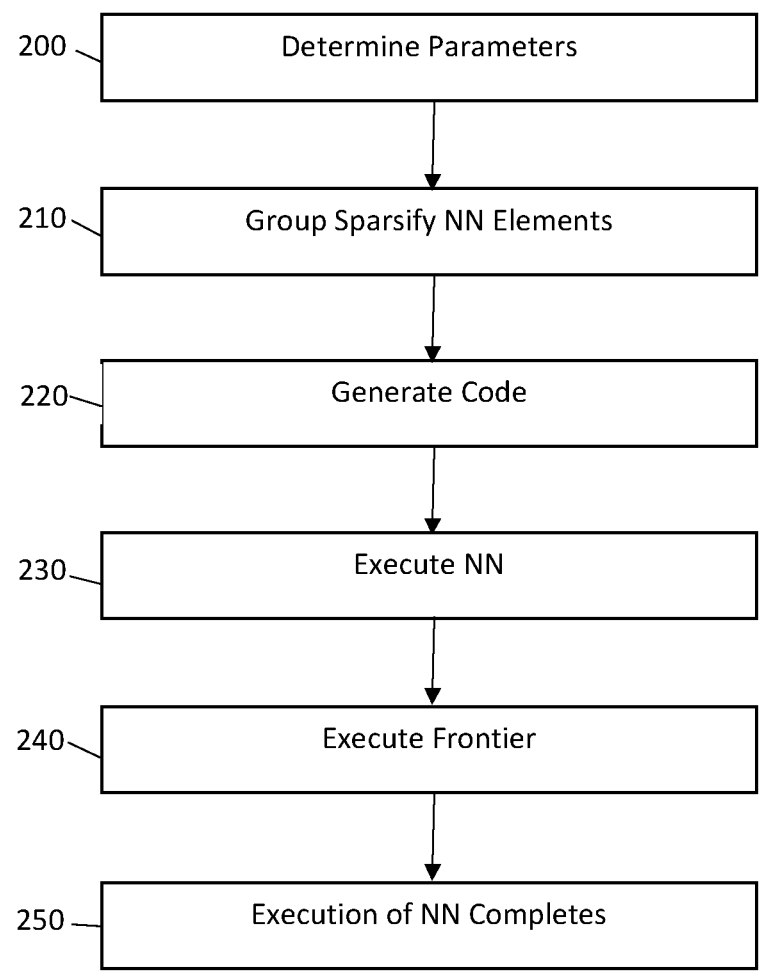
FIG. 9 is a flow diagram, depicting a method of execution of NNs, according to some embodiments of the invention.

FIG. 9 is a flow diagram, depicting a method of accelerating execution of NNs, according to some embodiments of the invention. The operations in FIG. 9 may be performed using components as in FIG. 1, but may be performed using other components.

In operation 200, parameters for creating group sparsity may be determined or set, for example according to the target architecture on which the NN will be executed, or instructions used to execute the NN, and/or optimization. For example a parameter defining the size of groups of non-sparse kernel entries may be the number of entries or size of indices, vectors or registers in a multiply-add (e.g. FMA) operation intended to be used. Parameters may also be set using feedback from performance, e.g. experimentally via optimization. Parameters may be set separately for different convolutional layers within one NN.

In operation 210, elements of the NN, e.g. elements of kernels, may be group sparsified. For example, groups of standard size (e.g. based on one or more parameters determined in operation 200) holding, generally, non-zero kernel entries may be created, the kernel entries outside the groups being sparsified and zero. In an example of a kernel defined by a matrix A, the group sparsified version A' of A may include a plurality of arrays of g elements where all elements of A outside the arrays are null, and elements within the arrays are generally non-zero, e.g. the only non-zero entries in A are within groups. Group sparsification may take place separately for different convolutional layers within one NN.

In operation 220, code may be generated. For example, a frontier may be determined or defined, e.g. for a matrix A representing a kernel of the NN, where for each row in matrix A, the first non-zero element of the row may be found. Code may be generated to iterate over the frontier, starting at the beginning of the defined groups and advancing along the elements of groups, one element at a time, or by larger numbers of elements if instructions such as VNNI instructions are used. The iteration may be a loop including a series of multiply and add instructions executed on each iteration such that the position of the matrix A operand operated on by each multiply and add instruction in the series is correlated to the iteration number of the loop. Additional code may be generated, e.g. executing non-convolutional or non-group sparsified layers, dividing or combining blocked matrices, producing output, and other code needed to execute the NN. Generating code iterating over a frontier may be done for each of a number of different convolutional layers of a NN, each time producing a different set of code, with different dimensions and parameters, if more than one convolutional layer exists.

In operation 230, execution of the NN may start, e.g. an input may be provided to the NN.

In operation 240, for a layer such as a convolutional layer, a frontier may be executed. As part of the convolutional execution, in each row of a group-sparse kernel, starting at a frontier, a multiply-add, vector, or other instruction may be executed, and the set of instructions across the rows of the kernel may be repeated or iterated across the groups of non-zero elements. A loop may be executed which includes a series of multiply and add, or vector, instructions to multiply a kernel matrix A by an input, where on each iteration the series of instructions are executed. During iteration, the position of the matrix A operand operated on by each multiply and add instruction in the series may be correlated to the iteration number of the loop. Other operations may be performed in a convolutional layer, e.g. computing an activation function. Operation 240 may be executed for each of a number of different convolutional layers, if more than one convolutional layer exists.

In operation 250, execution of the NN may complete, and an output (e.g. a classification, a translation, etc.) may be produced.

Other or different operations may take place.

Embodiments of the invention may include a technological improvement over currently available computer systems and methods for executing NN models by for example, one or more of accelerating NN model execution, allowing more instructions to be stored in an instruction cache, reducing the memory or cache footprint of instructions, increasing parallelism, and other benefits. Embodiments of the present invention may improve NN performance when used on CPU or general purpose processors as opposed to specialized GPUs, although embodiments may be used with GPUs as well. Currently available NN execution may not efficiently use instructions, may not as efficiently use cache and memory (e.g. in CPUs which have large caches), may not achieve high parallelism on CPUs, and may not take into account specific aspects of modern vectoral instruction sets, such as the Intel AVX512 VNNI instruction set. Accordingly, currently available systems for execution of NNs may not be adapted to optimally utilize modern instruction sets for the full benefit of boosting execution of NNs.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of creating neural network (NN) code by at least one processor, the NN comprising kernels, the method comprising:
   for a matrix A representing a kernel of the NN, for each row in matrix A, finding the first non-zero element of the row; and
   for a frontier defined by the first non-zero elements found for each row, creating a loop comprising a series of multiply and add instructions, such that:
      on each iteration of the loop the series of multiply and add instructions are executed; and
      a position of the matrix A operand operated on by each multiply and add instruction in the series is correlated to the iteration number of the loop:
   wherein the loop comprises: on each iteration, advancing the frontier along elements of a group of non-zero elements in each row, the group including the first non-zero element of the row defining the frontier, and reusing one or more instructions of the series of multiply and add instructions from one iteration to a next iteration,
   and wherein the series of multiply and add instructions occupies a cache memory element of the at least one processor, wherein the one or more reused instructions replace instructions fully unrolled by a compiler, the replaced instructions embedding weights of A into the code.

2. The method of claim 1, wherein matrix A comprises a plurality of arrays each comprising g elements wherein all elements of A outside the plurality of arrays are null.

3. The method of claim 2, wherein g is based on a parameter of a multiply and add instruction.

4. The method of claim 2, wherein g is determined during repeated optimization operations.

5. The method of claim 1, comprising creating the series of multiply-add instructions, each multiply-add instruction corresponding to the first non-zero element of a row of matrix A.

6. The method of claim 1, wherein each multiply and add instruction in the series of multiply and add instructions takes input from a different row of matrix A.

7. A system for creating neural network (NN) code, the NN comprising kernels, the system comprising:
   a memory and;
   a processor configured to:
      for a matrix A representing a kernel of the NN, for each row in matrix A, find the first non-zero element of the row; and
      for a frontier defined by the first non-zero elements found for each row, create a loop comprising a series of multiply and add instructions, such that:
         on each iteration of the loop the series of multiply and add instructions are executed; and
         a position of the matrix A operand operated on by each multiply and add instruction in the series is correlated to the iteration number of the loop:
      wherein the loop comprises: on each iteration, advancing the frontier along elements of a group of non-zero elements in each row, the group including the first non-zero element of the row defining the frontier, and reusing one or more instructions of the series of multiply and add instructions from one iteration to a next iteration,
      and wherein the series of multiply and add instructions occupies a cache memory element of the at least one processor, wherein the one or more reused instructions replace instructions fully unrolled by a compiler, the replaced instructions embedding weights of A into the code.

8. The system of claim 7, wherein matrix A comprises a plurality of arrays each comprising g elements wherein all elements of A outside the plurality of arrays are null.

9. The system of claim 8, wherein g is based on a parameter of a multiply and add instruction.

10. The system of claim 8, wherein g is determined during repeated optimization operations.

11. The system of claim 7, wherein the processor is configured to create the series of multiply-add instructions, each multiply-add instruction corresponding to the first non-zero element of a row of matrix A.

12. The system of claim 7, wherein each multiply and add instruction in the series of multiply and add instructions takes input from a different row of matrix A.

13. A method of executing a neural network (NN) comprising kernels, by at least one processor, the method comprising:
   using a frontier defined by first non-zero elements found for each row in a kernel matrix A, executing a loop comprising a series of multiply and add instructions to multiply the kernel matrix A by an input, such that:
      on each iteration of the loop the series of multiply and add instructions are executed; and
      a position of the matrix A operand operated on by each multiply and add instruction in the series is correlated to the iteration number of the loop:
   wherein the loop comprises: on each iteration, advancing the frontier along elements of a group of non-zero elements in each row, the group including the first non-zero element of the row defining the frontier, and reusing one or more instructions of the series of multiply and add instructions from one iteration to a next iteration, and wherein the series of multiply and add instructions occupies a cache memory element of the at least one processor, wherein the one or more reused instructions replace instructions embedding weights of A into the code.

14. The method of claim 13, wherein matrix A comprises a plurality of arrays of g elements wherein all elements of A outside the plurality of arrays are null.

15. The method of claim 14, wherein g is based on a parameter of a multiply and add instruction.

16. The method of claim 13, wherein each multiply and add instruction in the series of multiply and add instructions takes input from a different row of matrix A.

17. A system of executing a neural network (NN) comprising kernels, by at least one processor, the system comprising:
   a memory; and
   a processor configured to:
      using a frontier defined by first non-zero elements found for each row in a kernel matrix A, execute a loop comprising a series of multiply and add instructions to multiply the kernel matrix A by an input, such that:
         on each iteration of the loop the series of multiply and add instructions are executed; and
         a position of the matrix A operand operated on by each multiply and add instruction in the series is correlated to the iteration number of the loop:
      wherein the loop comprises: on each iteration, advancing the frontier along elements of a group of non-zero elements in each row, the group including the first non-zero element of the row defining the frontier, and reusing one or more instructions of the series of multiply and add instructions from one iteration to a next iteration, and wherein the series of multiply and add instructions occupies a cache memory element of the at least one processor, wherein the one or more reused instructions replace instructions fully unrolled by a compiler.

18. The system of claim 17, wherein matrix A comprises a plurality of arrays of g elements wherein all elements of A outside the plurality of arrays are null.

19. The system of claim 18, wherein g is based on a parameter of a multiply and add instruction.

20. The system of claim 17, wherein each multiply and add instruction in the series of multiply and add instructions takes input from a different row of matrix A.

* * * * *